(12) United States Patent
Haase et al.

(10) Patent No.: US 11,520,110 B2
(45) Date of Patent: Dec. 6, 2022

(54) OPTICAL DEVICE

(71) Applicant: 3M INNOVATIVE PROPERTIES COMPANY, St. Paul, MN (US)

(72) Inventors: Michael A. Haase, St. Paul, MN (US); James M. Nelson, Lino Lakes, MN (US); Terry L. Smith, Roseville, MN (US)

(73) Assignee: 3M INNOVATIVE PROPERTIES COMPANY, St. Paul, MN (US)

( * ) Notice: Subject to any disclaimer, the term of this patent is extended or adjusted under 35 U.S.C. 154(b) by 0 days.

(21) Appl. No.: 17/490,205

(22) Filed: Sep. 30, 2021

(65) Prior Publication Data

US 2022/0019032 A1    Jan. 20, 2022

Related U.S. Application Data

(63) Continuation of application No. 17/041,072, filed as application No. PCT/IB2019/055528 on Jun. 28, 2019, now Pat. No. 11,163,122.

(60) Provisional application No. 62/806,146, filed on Feb. 15, 2019, provisional application No. 62/691,871, filed on Jun. 29, 2018.

(51) Int. Cl.
*G02B 6/38* (2006.01)
*G02B 6/42* (2006.01)

(52) U.S. Cl.
CPC ......... *G02B 6/3866* (2013.01); *G02B 6/4214* (2013.01); *G02B 6/3853* (2013.01); *G02B 6/3881* (2013.01); *G02B 6/3885* (2013.01)

(58) Field of Classification Search
None
See application file for complete search history.

(56) References Cited

U.S. PATENT DOCUMENTS

| | | | |
|---|---|---|---|
| 6,115,521 A | 9/2000 | Tran | |
| 8,403,568 B2 * | 3/2013 | Wang | G02B 6/3817 385/139 |
| 8,591,123 B2 * | 11/2013 | Wang | G02B 6/3817 385/139 |
| 9,354,401 B2 * | 5/2016 | Leigh | G02B 6/3866 |
| 10,409,015 B1 * | 9/2019 | Son | G02B 6/4244 |

(Continued)

FOREIGN PATENT DOCUMENTS

| | | |
|---|---|---|
| WO | WO 2017-066018 | 4/2017 |
| WO | WO 2017-066022 | 4/2017 |

OTHER PUBLICATIONS

International Search report for PCT International Application No. PCT/IB2019/055528 dated Nov. 25, 2019, 5 pages.

*Primary Examiner* — Jerry Rahll
(74) *Attorney, Agent, or Firm* — Clifton F. Richardson

(57) ABSTRACT

A first optical device is adapted to couple to a second optical device along a coupling direction and includes two spaced apart pairs of leading and trailing pads, such that when the first optical device lands and slides on a landing surface of the second optical device to optically couple to the second optical device, and for each pair of leading and trailing pads, the leading pad prevents any debris on the landing surface from collecting on the trailing pad. Upon full coupling of the first optical device with the second optical device, the leading pads do not make contact with the landing surface. The first optical device may be, for example, an optical ferrule or a cradle having a recess adapted to receive an optical ferrule.

20 Claims, 15 Drawing Sheets

(56) References Cited

U.S. PATENT DOCUMENTS

| | | |
|---|---|---|
| 2010/0135618 A1 | 6/2010 | Howard |
| 2011/0091167 A1 | 4/2011 | Nishimura |
| 2011/0123151 A1 | 5/2011 | Zbinden |
| 2011/0305417 A1 | 12/2011 | Wang |
| 2012/0027346 A1 | 2/2012 | Castagna |
| 2012/0063725 A1 | 3/2012 | Meadowcroft |
| 2013/0136400 A1 | 5/2013 | Isenhour |
| 2015/0219863 A1 | 8/2015 | Haase et al. |
| 2015/0241640 A1 | 8/2015 | Sato |
| 2015/0323747 A1 | 11/2015 | Leigh |
| 2016/0202422 A1 | 7/2016 | De Jong |
| 2016/0259132 A1 | 9/2016 | Ling |
| 2017/0131480 A1 | 5/2017 | Bylander |
| 2018/0217337 A1 | 8/2018 | Smith |
| 2018/0259718 A1 | 9/2018 | Haase |
| 2018/0284357 A1 | 10/2018 | Nelson |
| 2018/0299630 A1 | 10/2018 | Son |
| 2019/0265422 A1 | 8/2019 | Son |

\* cited by examiner

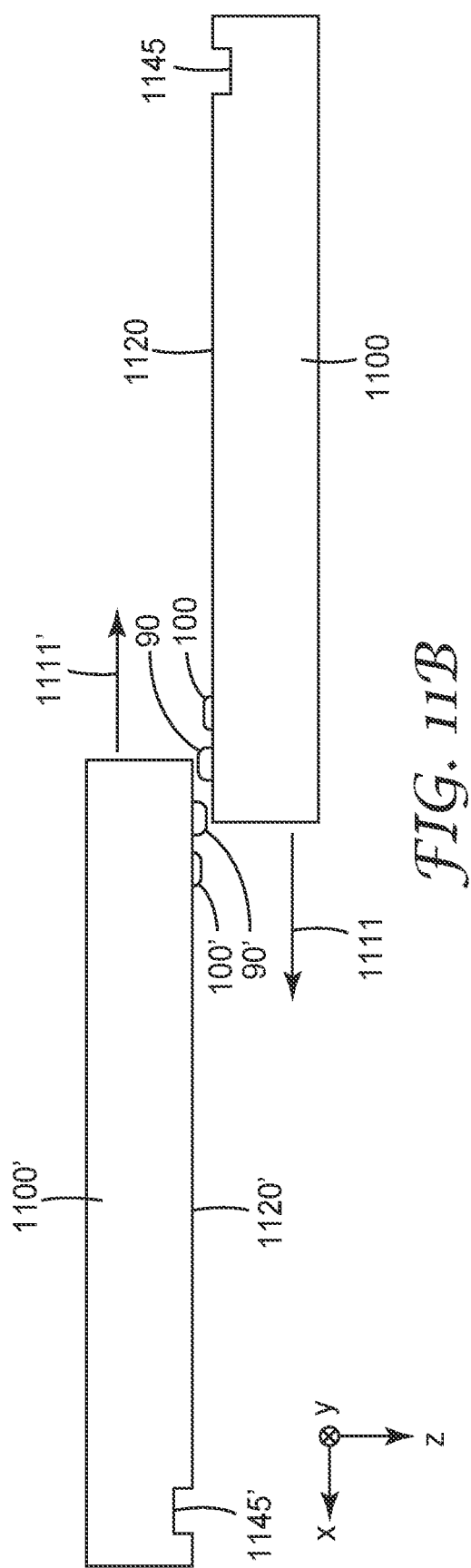
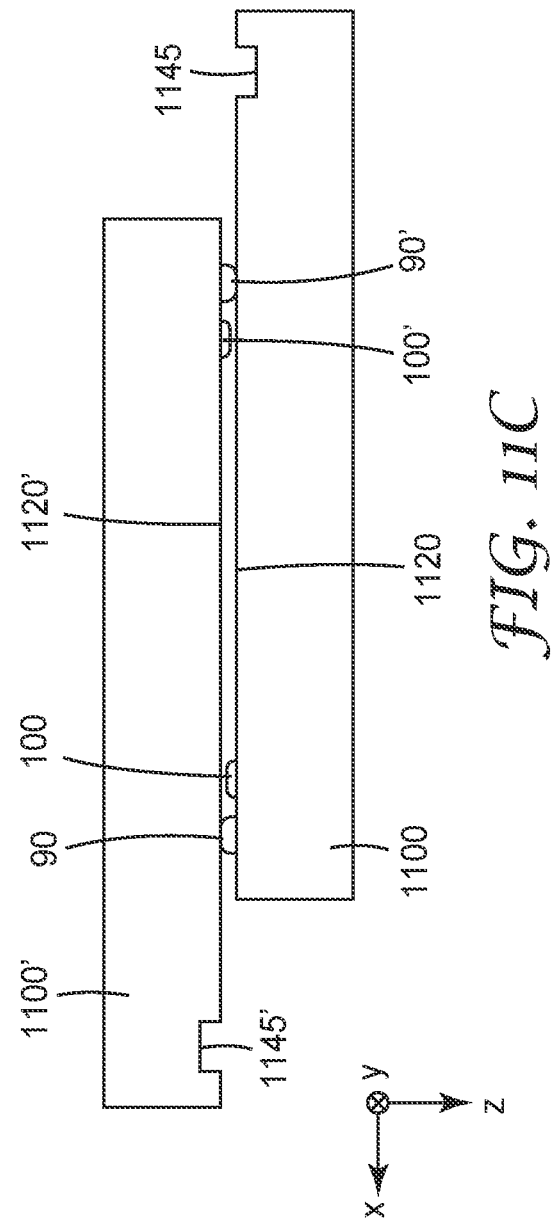

OPTICAL DEVICE

BACKGROUND

Optical connectors can be used for optical communications in a variety of applications including telecommunications networks, local area networks, data center links, and internal links in computer devices. Optical connectors can include optical ferrules.

SUMMARY

In some aspects of the present description, an optical ferrule is provided. The optical ferrule has opposing major top and bottom surfaces where the major top surface includes a first groove and a light redirecting surface and the major bottom surface includes discrete spaced apart first and second platforms arranged along a mating direction of the optical ferrule. The light redirecting surface is configured to receive light along a first direction from an optical waveguide received and supported in the first groove and redirect the received light along a different second direction. The redirected light exits the optical ferrule though the bottom surface. During a mating of the ferrule with a mating optical ferrule, the first and second platforms of the ferrule slide against corresponding respective first and second platforms of the mating ferrule. Upon full mating of the ferrule with the mating ferrule, the second platforms of the ferrule and the mating ferrule remain in contact with and rest on each other, and the first platform of neither ferrule makes contact with the other ferrule.

In some aspects of the present description, an optical ferrule including a first protrusion disposed between a second protrusion and a leading end of the ferrule is provided. The ferrule is configured to mate with a mating optical ferrule including a first protrusion disposed between a second protrusion and a leading end of the mating ferrule, such that when the ferrule fully mates with the mating ferrule, the second protrusions of the ferrule and the mating ferrule make contact with and rest on each other, the first protrusions of the ferrule and the mating ferrule are disposed on opposite sides of the second protrusions, and the first protrusion of each ferrule faces a major surface of the other ferrule without contacting it.

In some aspects of the present description, an optical ferrule including pluralities of first pads and second pads arranged on a same major first surface of the ferrule is provided. Each pad extends from the major first surface to a pad surface. When the ferrule fully mates with a mating ferrule, the pad surfaces of the second, but not the first, pads make contact with and rest on a major surface of the mating ferrule.

In some aspects of the present description, an optical ferrule including a plurality of pairs of leading and trailing pads is provided. During a mating of the ferrule with a mating optical ferrule and for each pair of leading and trailing pads, the leading pad slides against a major surface of the mating ferrule to prevent any debris on the major surface from collecting on the trailing pad, and upon full mating of the ferrule with the mating ferrule, the trailing, but not the leading, pads make contact with the major surface of the mating ferrule.

In some aspects of the present description, a first optical device adapted to couple to a second optical device along a coupling direction is provided. The first optical device includes two spaced apart pairs of leading and trailing pads, such that when the first optical device lands and slides on a landing surface of the second optical device to optically couple to the second optical device, and for each pair of leading and trailing pads, the leading pad prevents any debris on the landing surface from collecting on the trailing pad. Upon full coupling of the first optical device with the second optical device, the leading pads do not make contact with the landing surface.

In some aspects of the present description, an optical ferrule including a plurality of pairs of wiping and mating pads is provided. When the optical ferrule mates with a mating optical ferrule including a plurality of pairs of wiping and mating pads, the wiping pads of the ferrule and the mating ferrule wipe the mating pads of the mating ferrule and the ferrule, respectively, and upon full mating of the ferrule with the mating ferrule, the mating pads of the ferrule and the mating ferrule contact one another.

In some aspects of the present description, an optical ferrule including a plurality of pairs of first and second pads is provided. When the optical ferrule mates with a mating optical ferrule comprising a plurality of pairs of first and second pads, the first pads of the ferrule and the mating ferrule contact a surface of the mating ferrule and the ferrule, respectively, and upon full mating of the ferrule with the mating ferrule, the second, but not the first, pads of the ferrule contact the surface of the mating ferrule.

BRIEF DESCRIPTION OF THE DRAWINGS

FIG. 11B is a schematic cross-sectional view of the portion of the optical ferrule of FIG. 11A beginning to mate with a corresponding portion of a mating optical ferrule;

FIG. 11C is a schematic cross-sectional view illustrating the portions of the optical ferrule and mating ferrule of FIG. 11B at an intermediate point during mating;

DETAILED DESCRIPTION

In the following description, reference is made to the accompanying drawings that form a part hereof and in which various embodiments are shown by way of illustration. The drawings are not necessarily to scale. It is to be understood that other embodiments are contemplated and may be made without departing from the scope or spirit of the present description. The following detailed description, therefore, is not to be taken in a limiting sense.

Optical ferrules can be used to optically couple optical fibers to other optical fibers. For example, optical fibers attached to an optical ferrule can be optically coupled to optical fibers attached to a mating optical ferrule when the optical ferrule and the mating ferrule are mated. Optical ferrules can also be used to optically couple optical fibers to waveguides in a photonic integrated circuit (PIC), for example. For example, optical fibers attached to an optical ferrule can be optically coupled to a PIC when the optical ferrule is mated with a cradle mounted to the PIC. When an optical ferrule is mated to a mating ferrule or to a cradle, mating surfaces of the optical ferrule and mating ferrule or cradle typically contact one another. For example, the mating surfaces may contact each other over a substantially planar interface that may be, for example, roughly 3 mm long along a mating direction. If a single 5 micron diameter debris (e.g., dust) particle is trapped in the substantially planar interface, it would generate an angular error of about 0.1 degrees or larger. However, single mode expanded beam optical interconnect devices are often sensitive to angular errors on the order of 0.1 degrees and such angular errors can cause significant insertion loss, for example. It has been found, according to some embodiments of the present description, that including pairs of pads, protrusions, or platforms on the mating surface(s) of optical ferrules or other optical devices prevents debris from producing substantial alignment errors. For example, in some embodiments, an optical ferrule includes a plurality of pairs of leading and trailing pads, such that during a mating of the ferrule with a mating optical ferrule including a corresponding plurality of pairs of leading and trailing pads, and for each pair of leading and trailing pads, the leading pad of the ferrule slides against a trailing pad of the mating ferrule and a leading pad of the mating ferrule slides against the trailing pad of the ferrule. In some embodiments, upon full mating, the bottom surfaces of the ferrule and mating ferrule contact each other only along the trailing pads which have been cleared of debris by the sliding of the leading pads against the trailing pads during mating.

Figure 1A:
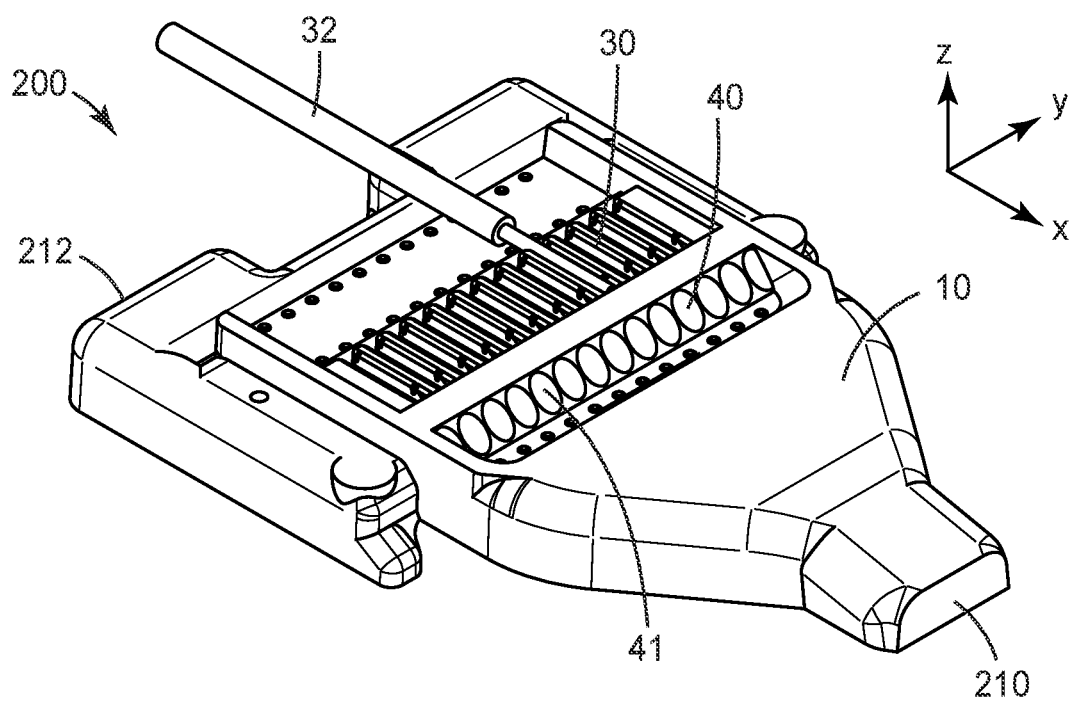
FIGS. 1A-1B are schematic top and bottom perspective views, respectively, of an optical ferrule.
Figure 1B:
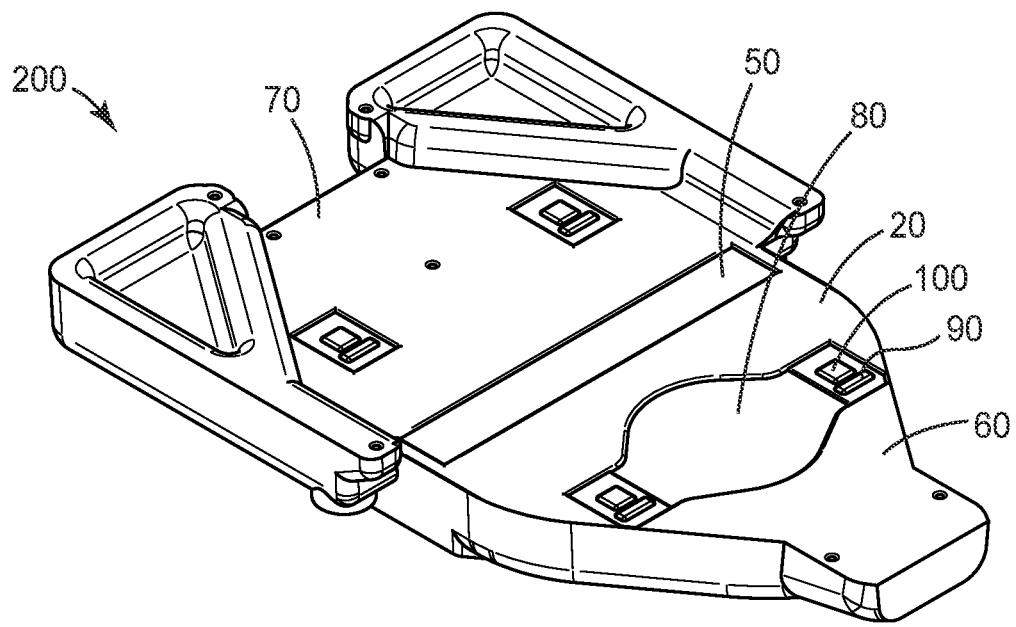

FIGS. 1A-1B are schematic top and bottom perspective views, respectively, of an optical ferrule 200 having opposing major top and bottom surfaces 10 and 20. The major top surface 10 includes a groove 30 and a light redirecting surface 40. In the illustrated embodiment, the major top surface 10 includes a plurality of grooves 30 extending along a first direction (x-direction) and arranged along an orthogonal direction (y-direction). The plurality of grooves 30 may be V-grooves, U-grooves, or Y-grooves, for example. Y-grooves are described in PCT publication Nos. WO 2017/066022 (Haase et al.) and 2017/066018 (Haase et al.), for example. In the illustrated embodiment, the light redirecting surface 40 includes a plurality of curved surface portions 41 (e.g., reflectors formed in the light redirecting surface 40) where each curved surface portion 41 is disposed to receive light from an optical waveguide received in a groove corresponding to the curved surface portion. The curved surface portions 41 may reflect by total internal reflection, for example. Optical ferrules having a light redirecting surface with curved surface portions are described in U.S. Pat. Publ. No. 2018/0259718 (Haase et al.), for example. The major surface including the groove 30 and light redirecting surface 40 may be referred to as the major top surface, and the major surface through which light exits the optical ferrule 200 may be referred to as the major bottom surface regardless of the orientation of the optical ferrule 200.

The optical ferrule 200 has a leading end 210 and a trailing end 212. The leading end 210 of the ferrule 200 is the end that first approaches a mating ferrule during mating of the ferrule 200 with the mating ferrule. The trailing end 212 is the end of the ferrule opposite the leading end 210 along a coupling direction or mating direction (x-direction) of the ferrule.

Figure 2:
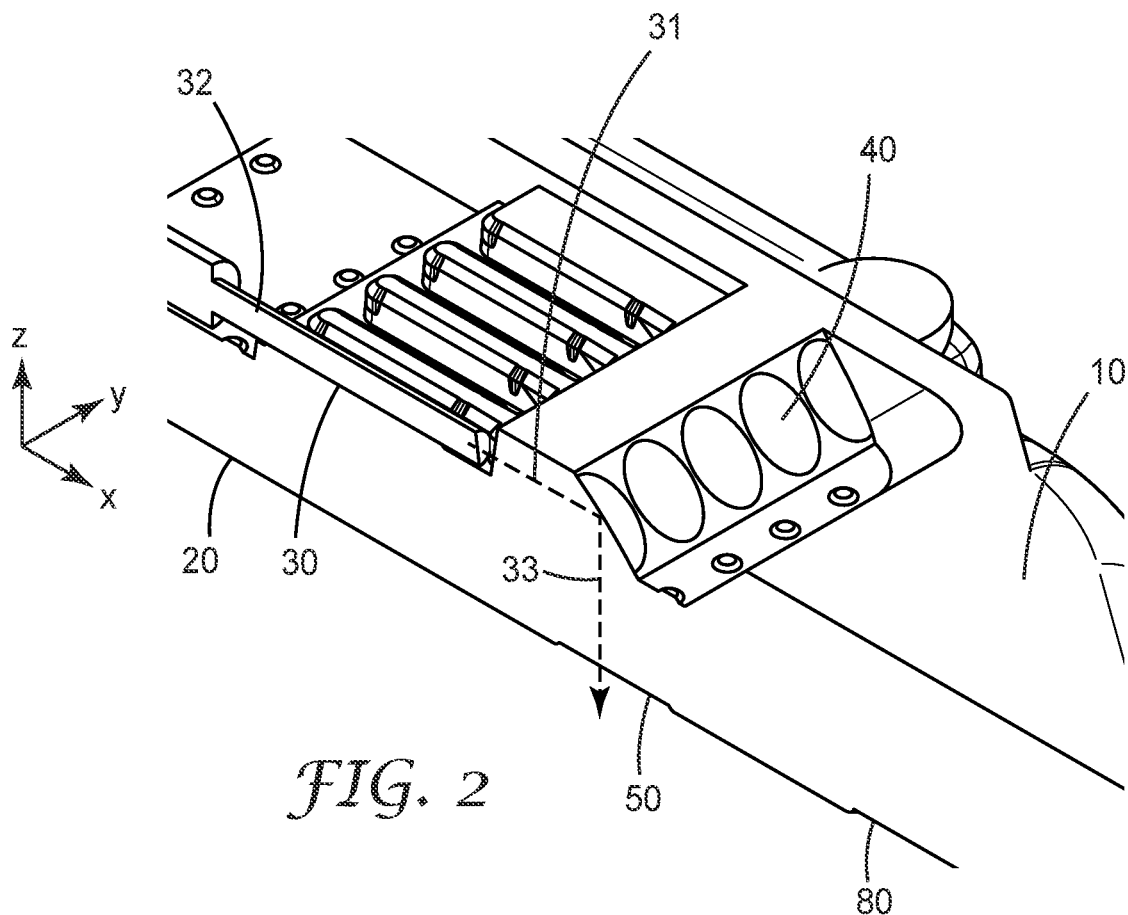
FIG. 2 is a schematic cutaway perspective view of a portion of the optical ferrule of FIGS. 1A-1B.

FIG. 2 is a schematic cutaway perspective view of a portion of the optical ferrule 200. The light redirecting surface 40 is configured to receive light 31 from an optical waveguide 32 received and supported in a first groove 30 along a first direction (x-direction) and redirect the received light along a different second direction (minus z-direction). The redirected light 33 exits the optical ferrule though the bottom surface 20. In some embodiments, the bottom surface 20 includes a window region 50 disposed between narrower front 60 and wider rear 70 portions of the bottom surface 20, and the redirected light 33 exits the optical ferrule 200 through the window region 50 of the bottom surface 20. In other embodiments, the window region 50 is disposed between front and rear portions 60 and 70 having a substantially same width. The front portion 60 is disposed closer to the leading end 210 and the rear portion 70 is disposed farther from the leading end 210. The window region 50 may be a recessed optical window and may be coated with an antireflective coating. Optical ferrules having a window region are described in U.S. Pat. Publ. No. 2018/0259718 (Haase et al.), for example.

Figure 3:
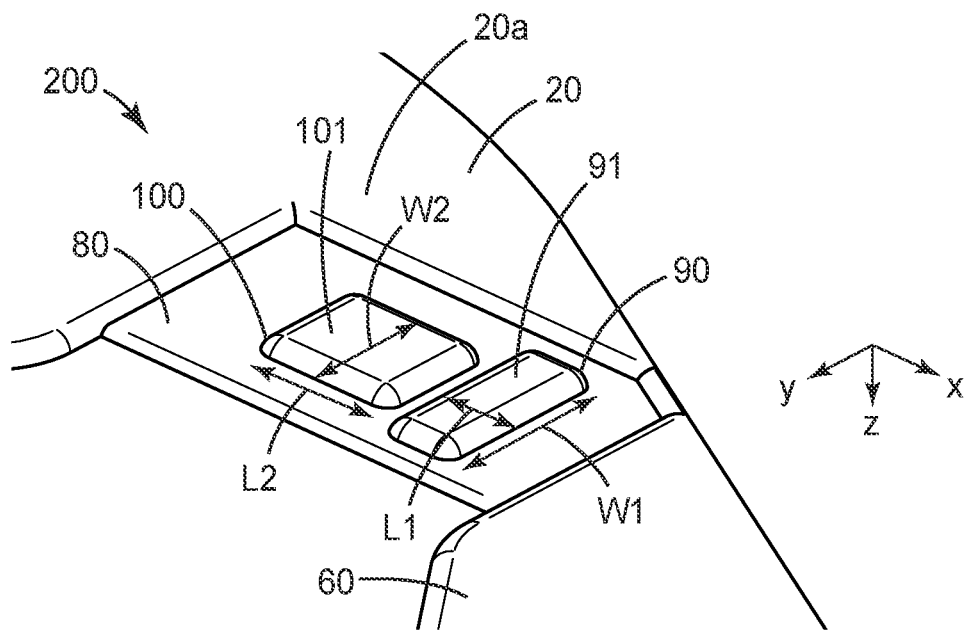
FIG. 3 is a schematic perspective view of a portion of a bottom surface of the optical ferrule of FIGS. 1A-1B.

FIG. 3 is a schematic perspective view of a portion of the bottom surface 20 of the optical ferrule 200. The bottom surface 20 includes pads, protrusions or platforms 90 and 100. In some embodiments, the bottom surface 20 includes discrete spaced apart first and second platforms 90 and 100 arranged along a mating direction (x-direction) of the optical ferrule 200. In some embodiments, the bottom surface 20 includes a first protrusion 90 disposed between a second protrusion 100 and a leading end 210 of the ferrule 200. In some embodiments, the optical ferrule 200 includes pluralities of first pads 90 and second pads 100 arranged on a same major first surface 20 of the ferrule 200, which also includes a major second surface 10 opposite the major first surface 20, where each pad extends from the major first surface 20 to a pad surface 91 and 101. In some embodiments, the pad surfaces 91 and 101 of the first and second pads 90 and 100 are substantially coplanar (e.g., any deviation of the pad surfaces from being coplanar may be substantially less than (e.g., less than 0.5 or 0.2 times) the lengths and widths of the pads 90 and 100). The pads 90, which are closer to the leading end 210, may be referred to as leading pads and the pads 100, which are farther from the leading end 210, may be referred to as trailing pads. In some embodiments, the leading pads of the ferrule and a corresponding mating ferrule are for wiping the trailing pads of the mating ferrule and the ferrule, respectively, and the trailing pads of the ferrule and the mating ferrule are for resting on one another. The first or leading pads, platforms, or protrusions may be referred to wiping pads, platforms, or protrusions, and the second or trailing pads, platforms, or protrusions may be referred to as mating pads, platforms, or protrusions. In some embodiments, the optical ferrule 200 includes a plurality of pairs of leading and trailing pads 90 and 100. In some embodiments, the narrower front portion 60 of the bottom surface 20 defines a recess 80 therein. In some embodiments, the pads or platforms 90 and 100 are formed in the recess 80 and extend higher than the bottom surface 20a adjacent the recess 80.

The first and second platforms 90 and 100 have respective first and second widths W1 and W2 along a width direction (y-direction), orthogonal to the mating direction (x-direction), of the optical ferrule 200. In some embodiments, light 31 is received along a first direction (e.g., x-direction) and the light redirecting surface 40 redirects the received light 31 along a second direction (e.g., minus z-direction) that is substantially orthogonal (e.g., orthogonal to within 30, or 20, or 10, or 5, or 3 degrees) to the width and mating directions. In some embodiments, the first direction is parallel to the mating direction. In some embodiments, the second width W2 is smaller than the first width W1. In some embodiments, the second width W2 is smaller than the first width W1 by at least about 10 microns, or at least about 20 microns, or at least about 30 microns, or at least about 40 microns, or at least about 50 microns. In some embodiments, the second width W2 is smaller than the first width W1 by at least about 5% or at least about 10%. It may be desired for W1 to be larger than W2 so that the first platform 90 wipes substantially all of the surface of the second platform 100 of the mating ferrule even if there is some misalignment, for example. The first and second platforms 90 and 100 have respective first and second lengths L1 and L2 along the mating direction (x-direction) of the optical ferrule 200. In some embodiments, the second length L2 is larger than the first length L1. In some embodiments, the second length L2 is at least about 1.5 times or at least about 2 times the first length. In some embodiments, the second length L2 is larger than the first length L1 by at least about 10 microns, or at least about 20 microns, or at least about 25 microns.

Figure 4A:
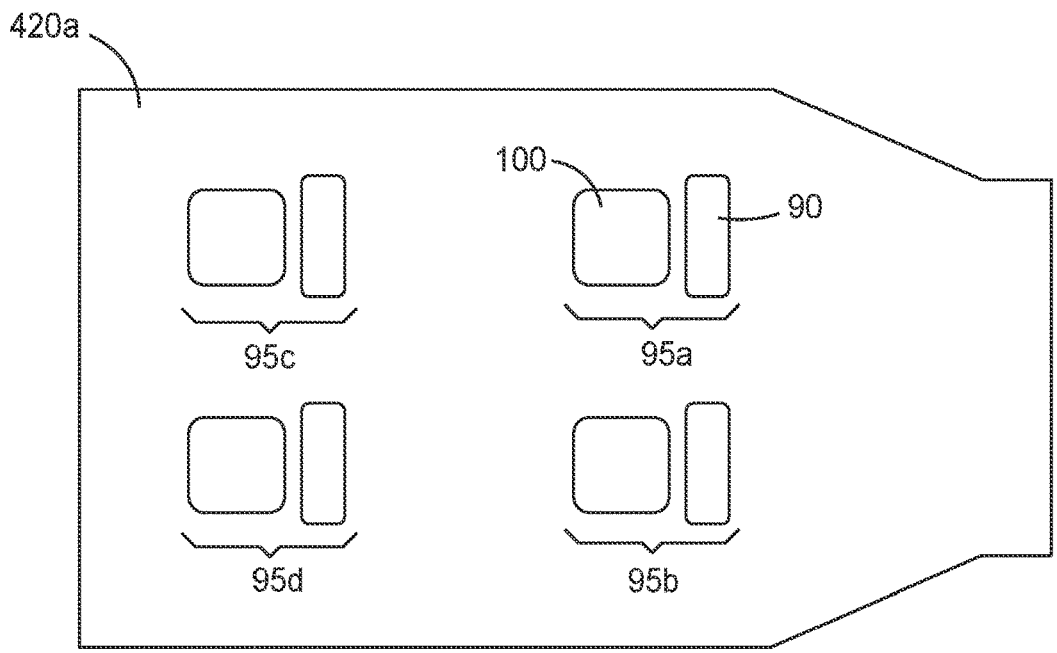
FIGS. 4A-4C are schematic plan views of major bottom surfaces of optical ferrules.
Figure 4B:
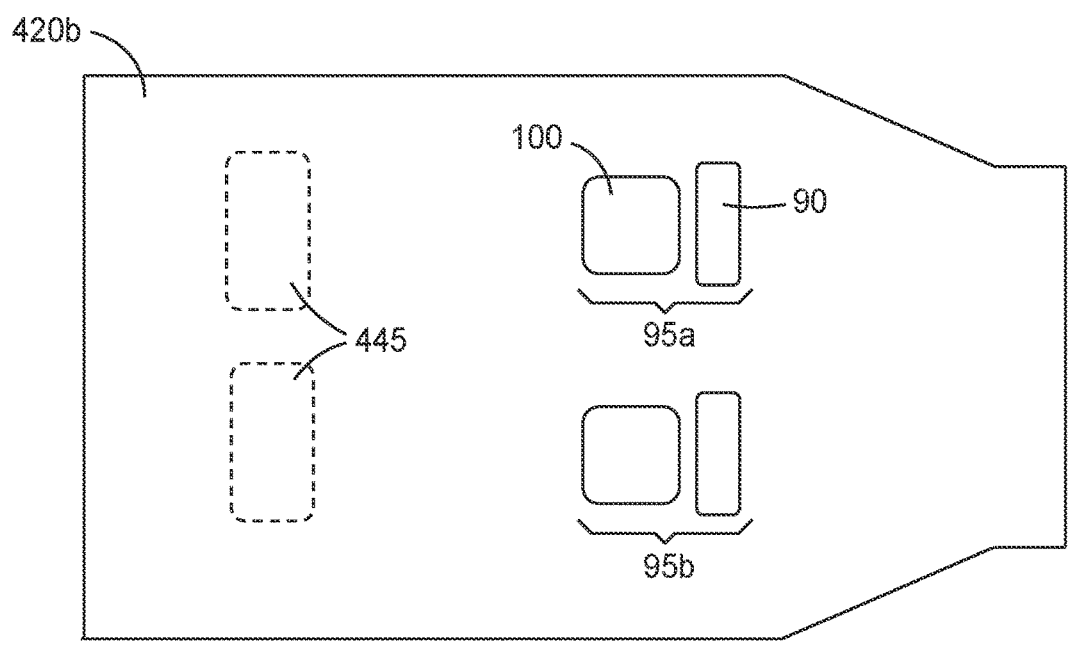
Figure 4C:
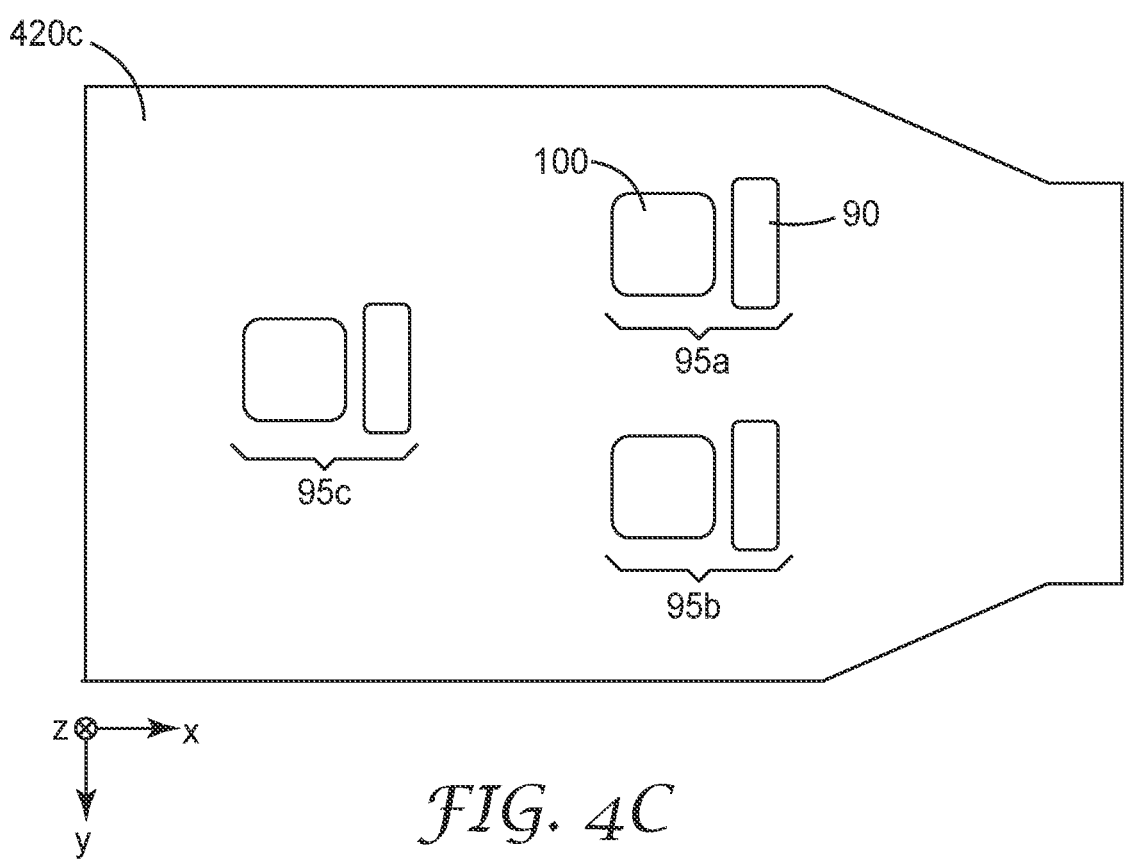

Various arrangements of pairs of the first and second platforms 90 and 100 are possible. Example arrangements are schematically illustrated in FIGS. 4A-4C. Other arrangements are also possible. For example, additional pairs may be included, or the pairs may be arranged in alternate patterns, or one or both of the first and second platforms 90 and 100 may have a different size and/or shape. The pairs of the first and second platforms 90 and 100 schematically illustrated in FIGS. 4A-4C can optionally be disposed in a recess defined in the major surface. The recess may be included to provide additional space for debris, for example.

FIG. 4A is a schematic illustration of a major surface 420a of an optical ferrule including four pairs 95a-95d of leading and trailing pads 90 and 100. In the illustrated embodiment, the pads 90 are arranged in a regular array and the pads 100 are arranged in a regular array. Any suitable number of pairs of leading and trailing pads can be included (e.g., one pair, two pairs, three pairs, four pairs, or more pairs). Two or more pairs may be included to provide greater mating stability than provided by a single pair. In some embodiments, only two pairs of pads are included. In other embodiments, three or more pairs, or four or more pairs are included.

FIG. 4B is a schematic illustration of a major surface 420b of an optical ferrule including two pairs 95a-95b of leading and trailing pads 90 and 100. As described further elsewhere herein (see, e.g., FIGS. 11A-11D), the major surface 420b may further include a plurality of recesses 445 such that upon full mating of a ferrule having the major surface 420b with a corresponding mating ferrule, each recess 445 is disposed to receive, but not contact, a corresponding leading pad of the mating ferrule while the trailing pads 100 contact the corresponding major surface of the mating ferrule. In some embodiments, an optical ferrule receives light from a waveguide along a first direction (e.g., x-direction) and redirects the received light along a different second direction (e.g., z-direction), and the two pairs 95a and 95b of leading and trailing pads 90 and 100 are aligned along a third direction (e.g., y-direction) substantially orthogonal to the first and second directions.

FIG. 4C is a schematic illustration of a major surface 420c of an optical ferrule including three pairs 95a-95c of leading and trailing pads 90 and 100. Each pair of leading and trailing pads 90 and 100 may have a same size and shape, or some leading and trailing pads may have a different size or shape than others. For example, the leading and trailing pads of pair 95c in FIG. 4C may have a different size and/or shape than the leading and trailing pads of the other pairs.

Figure 5A:
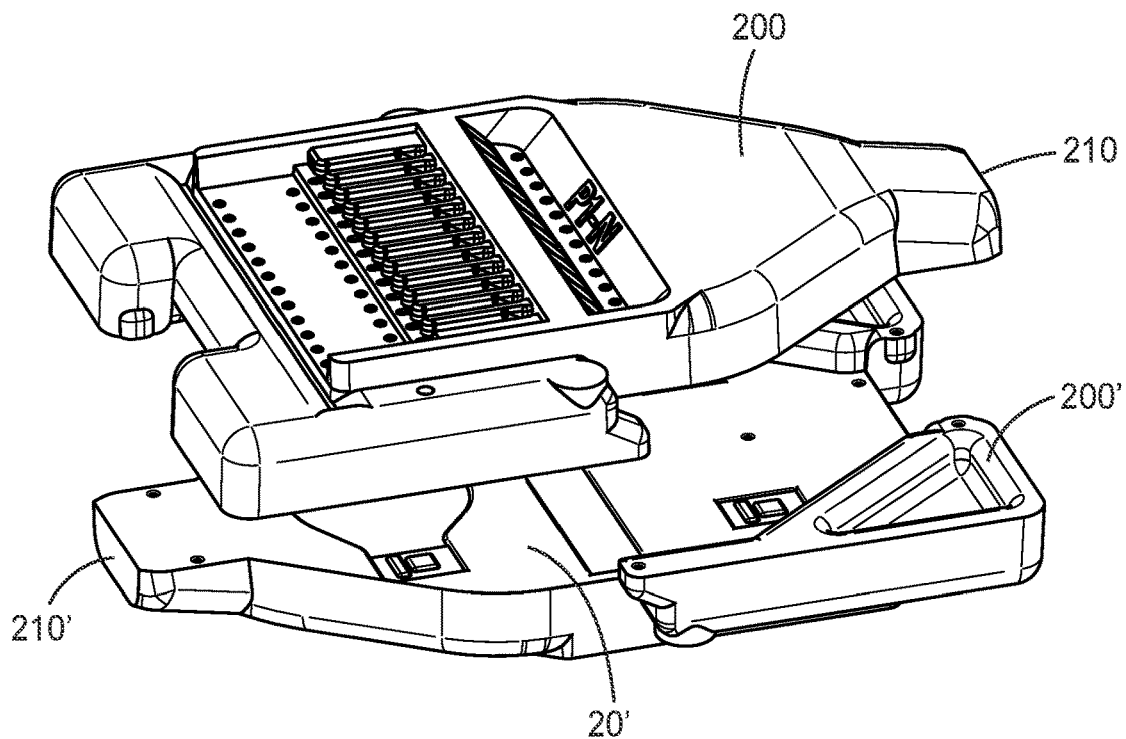
FIG. 5A is a schematic perspective view of an optical ferrule disposed proximate a mating optical ferrule.
Figure 5B:
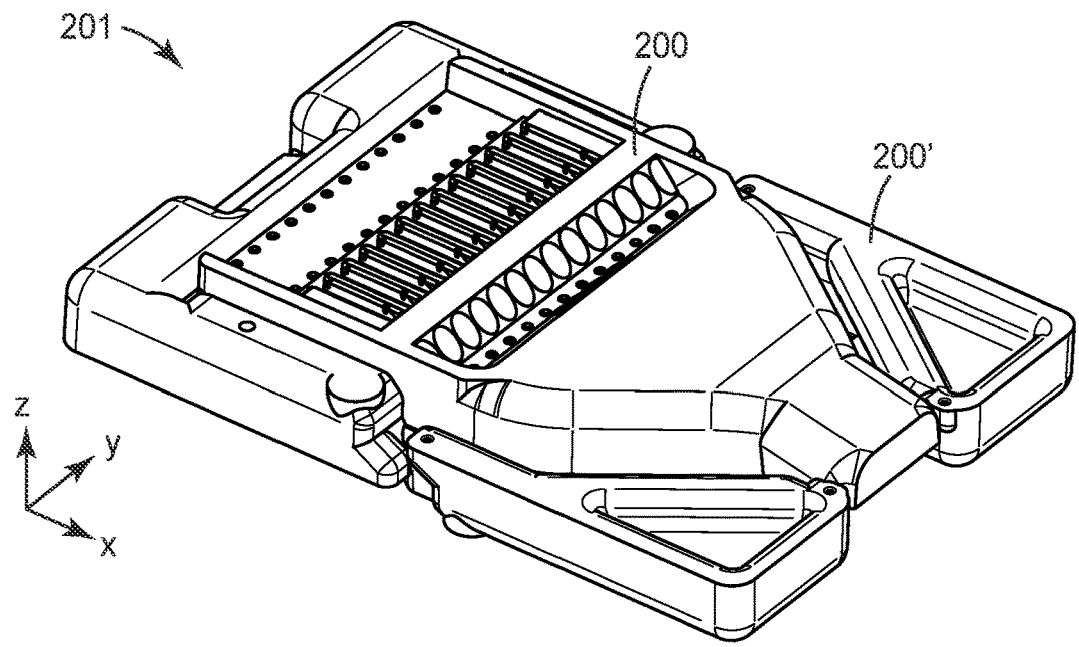
FIG. 5B is a schematic illustration of an optical assembly including an optical ferrule mated with a mating optical ferrule.
Figure 6A:
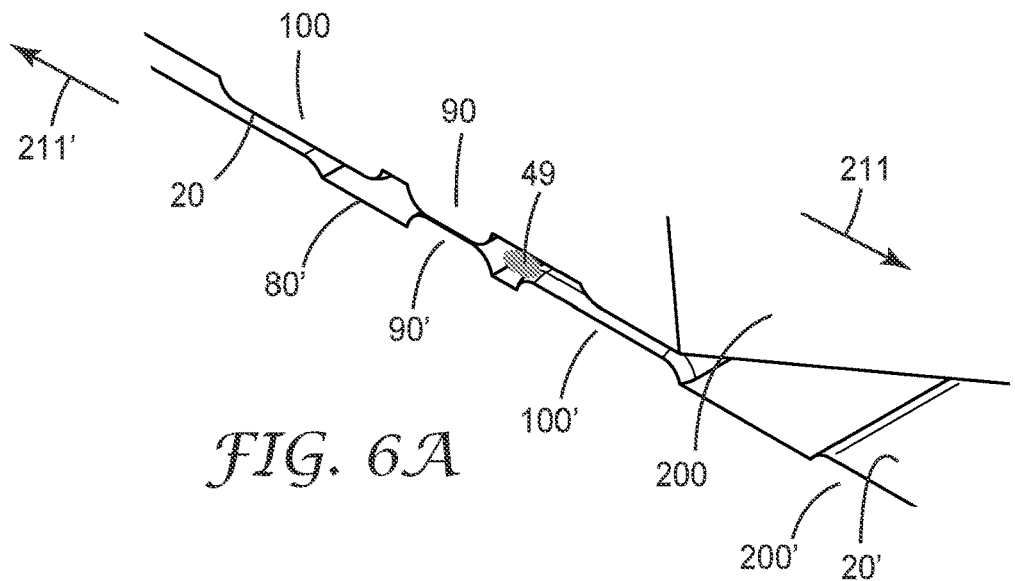
FIG. 6A is a schematic cutaway perspective view of a portion of an optical ferrule and a portion of a mating optical ferrule at a point during mating.
Figure 6B:
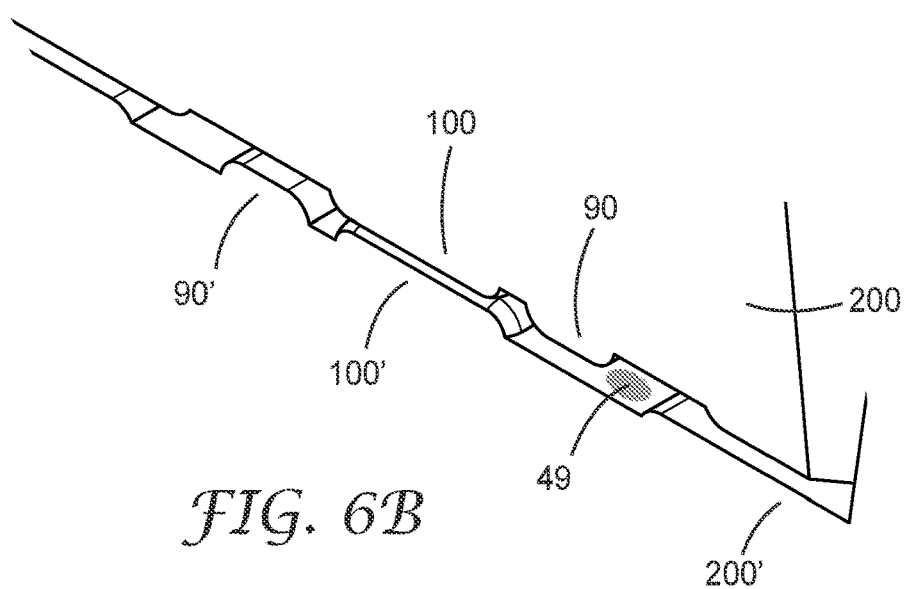
FIG. 6B is a schematic cutaway perspective view of a portion of an optical ferrule and a portion of a mating optical ferrule fully mated with the optical ferrule.

FIG. 5A is a schematic illustration of the optical ferrule 200 disposed proximate a mating optical ferrule 200'. FIG. 5B is a schematic illustration of an optical assembly 201 including first and second optical ferrules 200 and 200' mated to one another. FIGS. 6A-6B are schematic cutaway perspective views of a portion of the optical ferrule 200 and a portion of the mating optical ferrule 200' at a point during mating and upon full mating, respectively, of the ferrule 200 with the mating ferrule 200'. During mating, the ferrule 200 and mating ferrule 200' move relative to one another along the mating directions 211 and 211'. In some embodiments, the optical ferrule 200 includes a first pad, platform, or protrusion 90 disposed between a second pad, platform, or protrusion 100 and a leading end 210 of the ferrule 200, and the mating optical ferrule 200' includes a first pad, platform, or protrusion 90' disposed between a second pad, platform, or protrusion 100' and a leading end 210' of the mating ferrule 200'. In some embodiments, during a mating of the ferrule 200 with a mating optical ferrule 200', the first and second platforms 90 and 100 of the ferrule 200 slide against corresponding respective first and second platforms 90' and 100' of the mating ferrule 200', and upon full mating of the ferrule 200 with the mating ferrule 200', the second platforms 100 and 100' of the ferrule 200 and the mating ferrule 200' remain in contact with and rest on each other, and the first platform (90 and 90') of neither ferrule makes contact with the other ferrule. In some embodiments, during the mating of the optical ferrule 200 with the mating ferrule 200', the first platform 90 of the optical ferrule 200 dips into a recess 80' of the bottom surface 20' of the mating ferrule 200' prior to contacting the first platform 90' of the mating ferrule 200', where the first and second platforms 90' and 100' of the mating ferrule 200' are formed in the recess 80' of the bottom surface 20' of the mating ferrule 200'. In some embodiments, when the ferrule 200 fully mates with the mating ferrule 200', the second protrusions 100 and 100' of the ferrule 200 and the mating ferrule 200' make contact with and rest on each other, the first protrusions (90 and 90') of the ferrule and the mating ferrule are disposed on opposite sides of the second protrusions 100 and 100', and the first protrusion of each ferrule faces a major surface (20, 20') of the other ferrule without contacting it. In some embodiments, when the ferrule 200 fully mates with a mating ferrule 200', the pad surfaces 101 (see FIG. 3) of the first (100), but not the second (90), pads make contact with and rest on a major surface 20' of the mating ferrule 200'.

It has been found that including pairs of leading and trailing protrusions, platforms, or pads can improve alignment between mated optical devices by preventing debris from degrading alignment accuracy. In some embodiments, the leading pads 90 of the ferrule 200 wipe the trailing pads 100' of the mating ferrule 200' during mating and this mechanically pushes any debris initially present on the trailing pads 100' off the trailing pads 100' so that the debris does not interfere with the alignment of the ferrule 200 and mating ferrule 200'. Similarly, in some embodiments, the leading pads 90' of the mating ferrule 200' wipe the trailing pads 100 of the ferrule 200 during mating and this mechanically pushes any debris initially present on the trailing pads 100 off the trailing pads 100 so that the debris does not interfere with the alignment of the ferrule 200 and mating ferrule 200'.

In some embodiments, the first platforms (90, 90') of the ferrule 200 and the mating ferrule 200' are wiping platforms for wiping the second platforms (100', 100) of the mating ferrule 200' and the ferrule 200, respectively, and the second platforms (100, 100') of the ferrule 200 and the mating ferrule 200' are mating platforms for resting on one another. In some embodiments, after the wiping platforms (90, 90') of the ferrule 200 and the mating ferrule 200' wipe the mating platforms (100', 100) of the mating ferrule 200' and the ferrule 200, respectively, the mating platforms (100, 100') of the ferrule 200 and the mating ferrule 200' rest on one another. In some embodiments, after the wiping platforms (90, 90') of the ferrule 200 and the mating ferrule 200' wipe the mating platforms (100', 100) of the mating ferrule 200' and the ferrule 200, respectively, the mating platforms (100, 100') of the ferrule 200 and the mating ferrule 200' wipe one another and come to rest on one another.

In some embodiments, the optical ferrule 200 includes a plurality of pairs of wiping and mating pads 90 and 100 such that when the optical ferrule 200 mates with a mating optical ferrule 200' including a plurality of pairs of wiping and mating pads 90' and 100', the wiping pads of the ferrule 200 and the mating ferrule 200' wipe the mating pads of the mating ferrule 200' and the ferrule 200, respectively, and upon full mating of the ferrule 200 with the mating ferrule 200', the mating pads (100, 100') of the ferrule 200 and the mating ferrule 200' contact one another. In some embodiments, when the ferrule 200 is fully mated with the mating ferrule 200', the wiping pads 90 of the ferrule 200 do not contact the mating ferrule 200'. Similarly, in some embodiments, when the ferrule 200 is fully mated with the mating ferrule 200', the wiping pads 90' of the mating ferrule 200' do not contact the ferrule 200.

In some embodiments, the optical ferrule 200 includes a plurality of pairs of first and second pads 90 and 100 such that when the optical ferrule 200 mates with a mating optical ferrule 200' including a plurality of pairs of first and second pads 90' and 100', the first pads (90, 90') of the ferrule 200 and the mating ferrule 200' contact a surface (20', 20) of the mating ferrule 200' and the ferrule 200, respectively, and upon full mating of the ferrule 200 with the mating ferrule 200', the second (100), but not the first (90), pads of the ferrule 200 contact the surface 20' of the mating ferrule 200'. In some embodiments, the first pads (90, 90') of the ferrule 200 and the mating ferrule 200' are wiping pads for wiping the second pads (100', 100) of the mating ferrule 200' and the ferrule 200, respectively, and the second pads (100, 100') of the ferrule 200 and the mating ferrule 200' are mating pads for resting on one another. In some embodiments, after the wiping pads (90, 90') of the ferrule 200 and the mating ferrule 200' wipe the mating pads (100', 100) of the mating ferrule 200' and the ferrule 200, respectively, the mating pads (100, 100') of the ferrule 200 and the mating ferrule 200' rest on one another. In some embodiments, after the wiping pads (90, 90') of the ferrule 200 and the mating ferrule 200' wipe the mating pads (100', 100) of the mating ferrule 200' and the ferrule 200, respectively, the mating pads (100, 100') of the ferrule 200 and the mating ferrule 200' wipe one another and come to rest on one another.

In some embodiments, the optical ferrule 200 includes a plurality of pairs of leading and trailing pads 90 and 100, such that during a mating of the ferrule 200 with the mating optical ferrule 200' and for each pair of leading and trailing pads 90 and 100, the leading pad 90 slides against a major surface 20' of the mating ferrule 200' to prevent any debris 49 on the major surface 20' from collecting on the trailing pad 100, and upon full mating of the ferrule 200 with the mating ferrule 200', the trailing (100), but not the leading (90), pads make contact with the major surface 20' of the mating ferrule 200'. In some embodiments, a first optical device (e.g., optical ferrule 200 or a cradle adapted to receive optical ferrule 200) adapted to couple to a second optical device (e.g., mating optical ferrule 200' or a cradle adapted to receive optical ferule 200) along a coupling direction (x-direction) and includes two or more spaced apart pairs of leading and trailing pads 90 and 100, such that when the first optical device lands and slides on a landing surface (e.g., major surface 20' or a bottom surface of a cavity or recess of a cradle as described further elsewhere herein) of the second optical device to optically couple to the second optical device, and for each pair of leading and trailing pads 90 and 100, the leading pad 90 prevents any debris 49 on the landing surface from collecting on the trailing pad 100. In some embodiments, upon full coupling of the first optical device with the second optical device, the leading pads 90 do not make contact with the landing surface.

In some embodiments, the bottom surface 20 includes a plurality of platforms where the plurality of platforms includes the first and second platforms 90 and 100. In some embodiments, the plurality of platforms includes a plurality of spaced apart pairs of the first and second platforms 90 and 100. In some embodiments, during a mating of the ferrule 200 with a mating optical ferrule 200' including a corresponding plurality of platforms, the bottom surfaces of the optical ferrule 200 and mating ferrule 200' contact one another only at the pluralities of platforms. In some embodiments, the bottom surface 20 includes a plurality of platforms where the plurality of platforms include the first and second platforms 90 and 100, and upon full mating of the ferrule 200 with a mating optical ferrule 200' including a corresponding plurality of platforms, the bottom surfaces (20, 20') of the ferrule 200 and mating ferrule 200' contact one another only at those platforms in the pluralities of platforms that have been wiped by at least one other platform during mating of the ferrule 200 with the mating ferrule 200'. In some embodiments, the plurality of platforms includes a plurality of pairs of first and second platforms 90 and 100. In some embodiments, the platforms in the pluralities of platforms that have been wiped by at least one other platform include only the second platforms 100 and 100'.

In some embodiments, the optical ferrule 200 and the mating ferrule 200' have a substantially same size and shape (e.g., each dimension differing by less than 30, 20, or 10 percent). In some embodiments, the optical ferrule 200 is hermaphroditic. In some embodiments, a mating surface of an optical ferrule or other optical device and a mating surface of a mating optical ferrule or other mating optical device adapted to mate with the optical ferrule or optical device have a substantially same size and shape. For example, the bottom surfaces 20 and 20' may have a substantially same size and shape. In some embodiments, a portion of a mating surface of an optical ferrule or other optical device that includes the pads, protrusions or platforms and a corresponding portion of a mating surface of the mating optical ferrule or other mating optical device have a substantially same size and shape.

Figure 7:
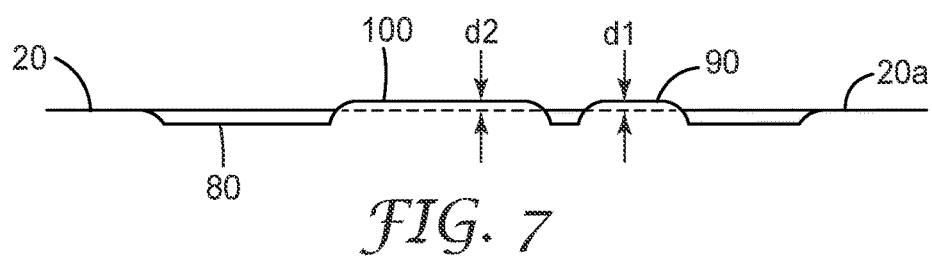
FIG. 7 is a schematic illustration of a cross-section through a recess formed in the bottom surface of an optical ferrule.

FIG. 7 is a schematic cross-sectional view through a recess 80 formed in the bottom surface 20. In some embodiments, the narrower front portion 60 of the bottom surface 20 defines the recess 80 therein, and the first and second platforms 90 and 100 are formed in the recess and extend higher than the bottom surface 20a adjacent the recess.

In some embodiments, the first and second platforms 90 and 100 extend higher than a region 20a of the bottom surface 20 proximate the first and second platforms by respective first and second distances d1 and d2. In some embodiments, the first and second platforms 90 and 100 are formed in the recess 80 and the region 20a of the bottom surface 20 proximate the first and second platforms 90 and 100 is adjacent to and outside of the recess 80. In such embodiments or in other embodiments, the first and second platforms 90 and 100 extend higher than the bottom surface 20a adjacent the recess 80 by the respective first and second distances d1 and d2. In other embodiments, the first and second platforms 90 and 100 are not formed in a recess (see, e.g., FIG. 10A). In some embodiments, d1 is substantially equal to d2 (e.g., equal to within about 5%, or to within about 3%, or to within about 2%). In some embodiments, d1>d2 (e.g., d1 may be at least 10% or at least 20% greater than d2). In some embodiments, d1 and d2 are each at least about 5 microns, or at least about 10 microns, or at least about 20 microns.

Figure 8:
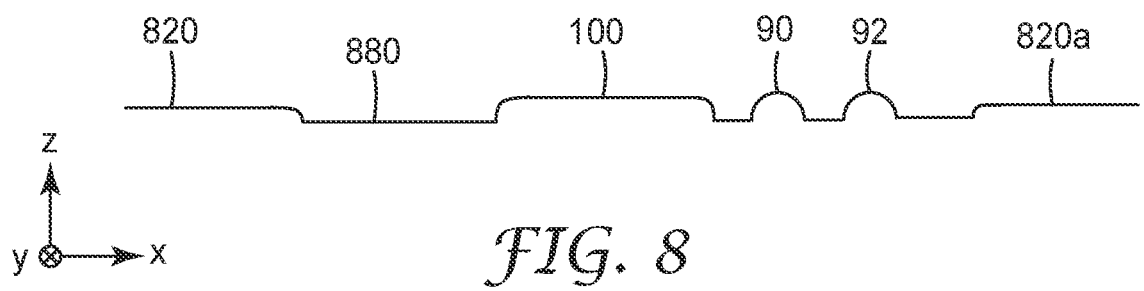
FIG. 8 is a schematic cross-sectional view of a portion of a bottom surface of an optical device.

FIG. 8 is a schematic cross-sectional view of a portion of a bottom surface 820 of an optical device defining a recess 880 therein. The optical device may be an optical ferrule or a cradle adapted to receive an optical ferrule, for example. First, second and third pads, protrusions, or platforms 90, 100 and 92 are formed in the recess and extend higher than the bottom surface 820a adjacent the recess. The first platform 90 is disposed between and spaced apart from the second 100 and third 92 platforms. In some embodiments, the first and third platforms have a substantially same size and shape. In other embodiments, the first and third platforms have a different size and/or shape.

Figure 9A:
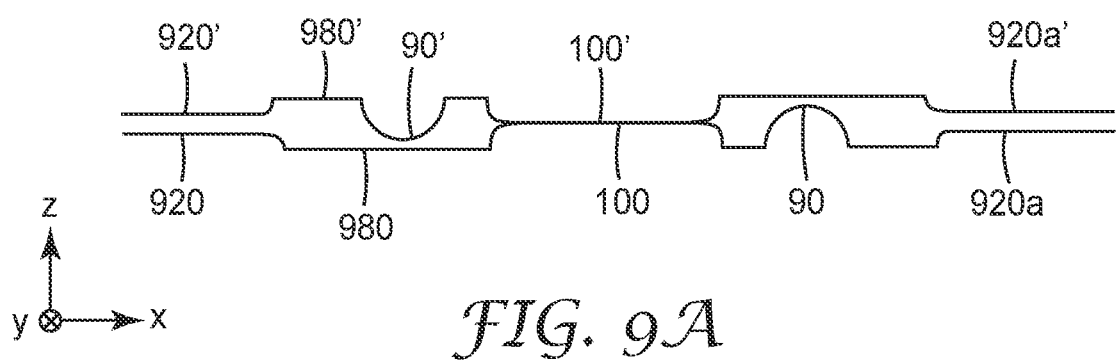
FIG. 9A is a schematic cross-sectional view of portions of major surfaces of an optical device and an optical mating device mated to one another.

FIG. 9A is a schematic cross-sectional view of portions of major surfaces 920 and 920' of first and second optical devices mated with one another. The first optical device may be an optical ferrule and the second optical device may be another optical ferrule or a cradle adapted to receive the optical ferrule, for example. The major surfaces 920 and 920' may have a substantially same size and shape. The major surface 920 defines a recess 980 therein and the major surface 920' defines a recess 980' therein. First and second protrusions, pads, or platforms 90 and 100 are formed in the recess 980 and extend higher than the bottom surface 920a adjacent the recess 900, and corresponding first and second protrusions, pads, or platforms 90' and 100' are formed in the recess 980' and extend higher (in a direction away from the body of the mating optical device) than the bottom surface 920a' adjacent the recess 920'. The first and second platforms 90 and 100 extend higher than the bottom surface 920a adjacent the recess 980 by respective first and second distances, where the first distance is greater than the second distance. The corresponding second platforms 100 and 100' are in contact with and rest on each other. The corresponding first platforms 90 and 90' of neither optical device makes contact with the other optical device. The first platform 90 extends partially into the recess 980' of the mating optical device. Similarly, the first platform 90' extends partially into the recess 980 of the optical device. In some embodiments, upon full mating of the optical device (e.g., optical ferrule) with the mating device (e.g., mating optical ferrule), each second pad 100 of the optical device and corresponding second pad 100' of the mating device remain in contact with and rest on each other, the corresponding first pads 90 and 90' of the optical device and the mating device are disposed on opposite sides of the second pads 100 and 100', and the first and third pads of each device face a major surface (920, 920') of the other device without contacting it. In some embodiments, the first optical device is an optical ferrule, the second optical device is a mating ferrule, and upon full mating of the ferrule with the mating ferrule, the second protrusions 100 and 100' of the ferrule and the mating ferrule remain in contact with and rest on each other, and the first protrusion (90, 90') of neither ferrule makes contact with the other ferrule.

Figure 9B:
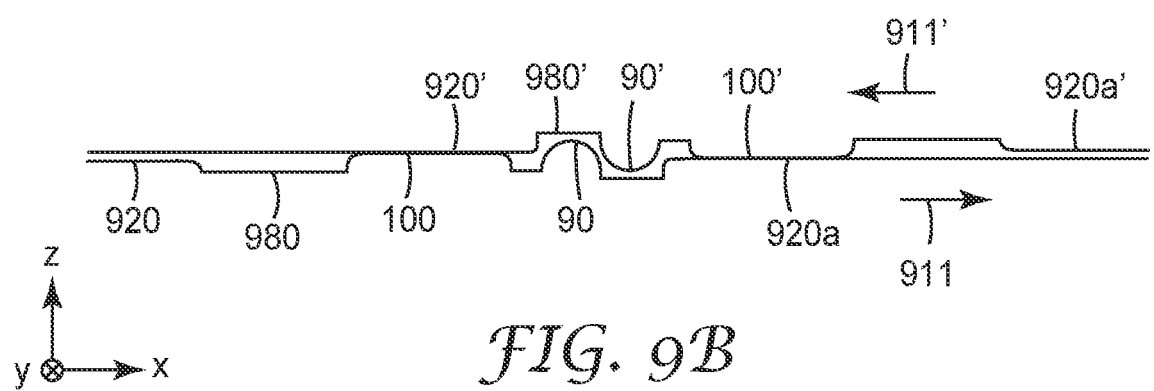
FIG. 9B is a schematic cross-sectional view of portions of major surfaces of an optical device and an optical mating device during mating.

FIG. 9B is a schematic cross-sectional view of portions of the major surfaces 920 and 920' of the first and second optical devices at a point during the mating where the first platform 90 has dipped into the recess 980' of the bottom surface 920' prior to contacting the first platform 90'. Similarly, the first platform 90' has dipped into the recess 980 of the bottom surface 920 prior to contacting the first platform 90. During mating, the major surfaces 920 and 920' of the ferrule and mating ferrule move relative to one another along the mating directions 911 and 911'.

In some embodiments, the pads or platforms are disposed on a major surface of an optical ferrule or optical device without being disposed in a recess defined in the major surface.

Figure 10A:
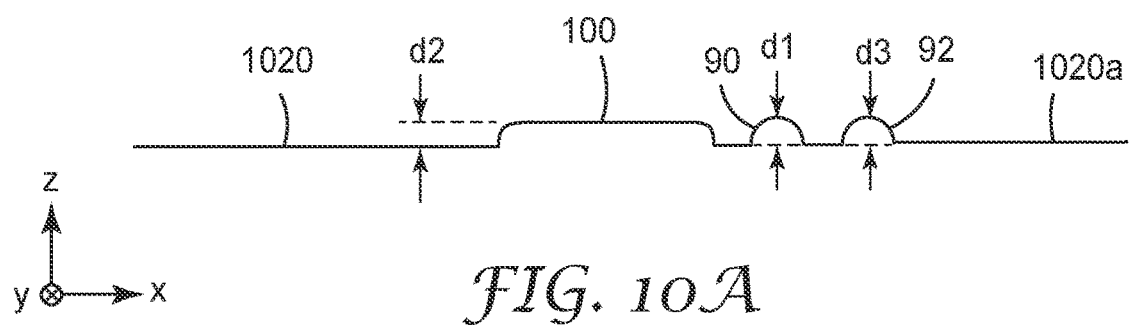
FIG. 10A is a schematic cross-sectional view of a portion of a major surface of an optical ferrule.

FIG. 10A is a schematic cross-sectional view of a portion of a major surface 1020 of an optical ferrule (or other optical device, such as a cradle adapted to receive an optical ferrule). The major surface 1020 includes discrete spaced apart first and second platforms 90 and 100 arranged along a mating direction (x-direction) of the optical ferrule. In the illustrated embodiment, the major surface 1020 further includes an optional third platform 92. The first platform 90 is disposed between and spaced apart from the second 100 and third 92 platforms. The first and second platforms 90 and 100 extend higher than a region of the bottom surface 1020*a* proximate the first and second platforms 90 and 100 by respective first and second distances d1 and d2, which may be in any of the ranges described elsewhere herein. In some embodiments, 2d2>d1>d2. In some embodiments, d3 is substantially equal to d1. In some embodiments, d3 is different from d1. In some embodiments, d1, d2, and d3 are each at least about 5 microns, or at least about 10 microns, or at least about 20 microns.

Figure 10B:
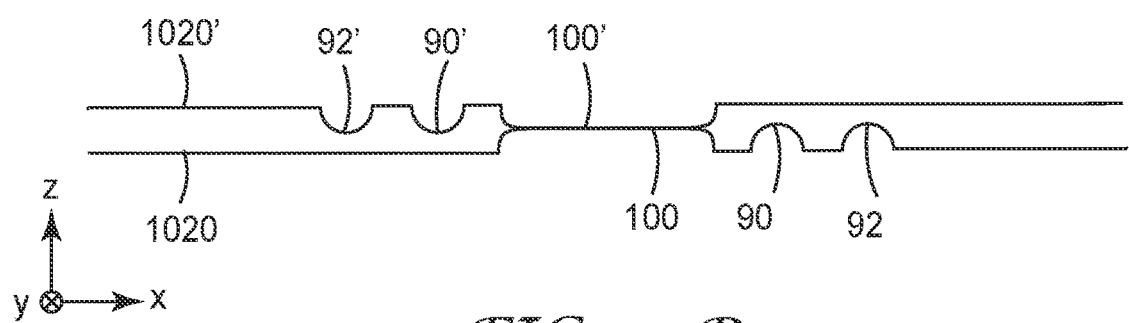
FIG. 10B is a schematic cross-sectional view of the portion of the major surface of the optical ferrule of FIG. 10A and a corresponding portion of a major surface of a mating optical ferrule when the ferrule and mating ferrule are fully mated.

FIG. 10B is a schematic cross-sectional view of the portion of the major surface 1020 of the optical ferrule and a corresponding portion of a major surface 1020' of a mating optical ferrule when the ferrule and mating ferrule are fully mated. The major surface 1020' includes first, second and third platforms 90', 100', and 92', corresponding to the first, second and third platforms 90, 100, and 92 of the major surface 1020. In some embodiments, upon full mating of the ferrule with the mating ferrule, each second platform 100 of the ferrule and corresponding second platform 100' of the mating ferrule remain in contact with and rest on each other, the corresponding first (90 and 90') and third (92 and 92') platforms of the ferrule and the mating ferrule are disposed on opposite sides of the second platform 100 and 100', and the first and third platforms of each ferrule face a major surface (1020, 1020') of the other ferrule without contacting it.

In some embodiments, upon full mating of the ferrule with the mating ferrule, the trailing pads of the ferrule do not make contact with any pads on the major surface of the mating ferrule.

Figure 11A:
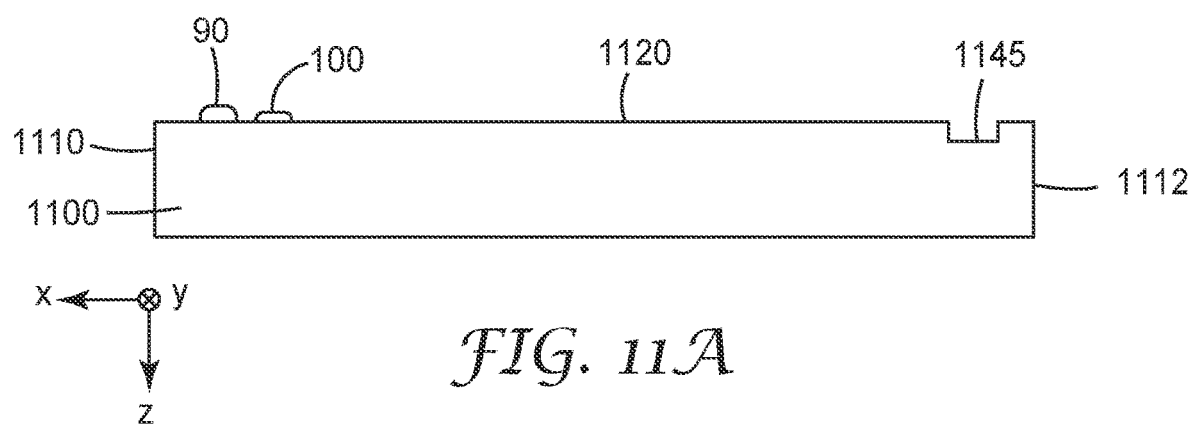
FIG. 11A is a schematic cross-sectional view of a portion of an optical ferrule.
Figure 11D:
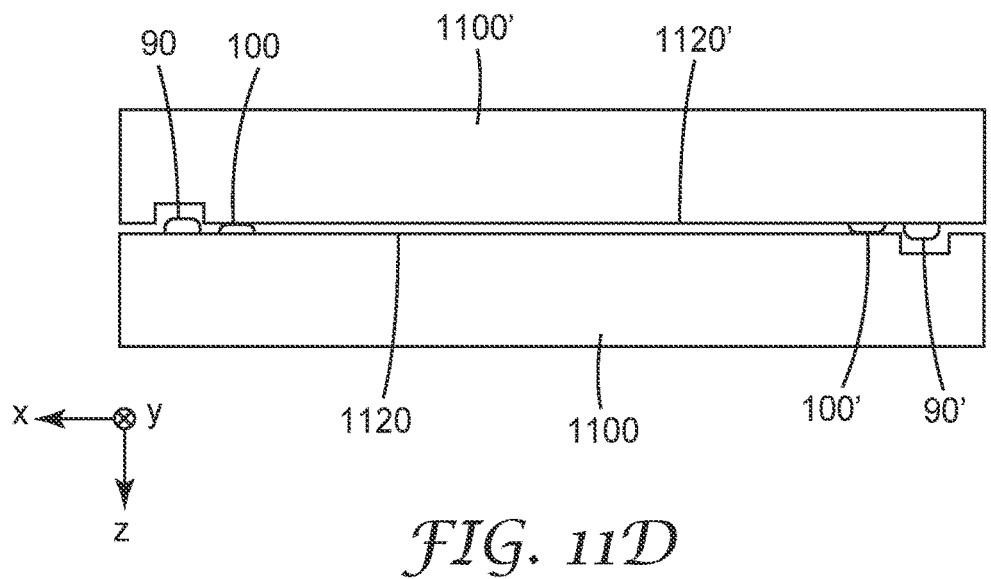
FIG. 11D is a schematic cross-sectional view illustrating the portions of the optical ferrule and mating ferrule of FIG. 11B fully mated with one another.

FIG. 11A is a schematic cross-sectional view of a portion of an optical ferrule 1100 having a leading end 1110, a trailing end 1112, and a major surface 1120 including a plurality of pairs of leading and trailing pads 90 and 100. The optical ferrule 1100 may include additional features such as waveguide alignment grooves and light redirecting surfaces that are not shown. The major surface 1120 is a mating surface of the optical ferrule 1100 and may be referred to as a bottom major surface regardless of the orientation of the optical ferrule 1100. One pair of the pads are shown in the illustrated cross-section. At least one other pair may be present in a cross-section displaced in the y-direction from the illustrated cross-section (see, e.g., FIG. 4B). FIG. 11B is a schematic cross-sectional view of the portion of the optical ferrule 1100 beginning to mate with a corresponding portion of a mating optical ferrule 1100'. During mating, the ferrule 1100 and mating ferrule 1100' move relative to one another along the mating directions 1111 and 1111'. The mating ferrule 1100' has a bottom surface 1120' including a plurality of pairs of leading and trailing pads 90' and 100'. FIG. 11C is a schematic cross-sectional view illustrating the optical ferrule 1100 during mating with the mating optical ferrule 1100'. FIG. 11D is a schematic cross-sectional view illustrating the optical ferrule 1100 fully mated with the mating optical ferrule 1100'. Upon full mating, the trailing pads 100 of the ferrule 1100 contact the bottom major surface of the mating ferrule 1100', but do not make contact with any pads on the major surface 1120' of the mating ferrule 1100'. In some embodiments, the bottom major surface 1120 further includes a plurality of recesses 1145 such that upon full mating of the ferrule 1100 with the mating ferrule 1100', each recess 1145 is disposed to receive a corresponding leading pad 90' of the mating ferrule 1100'. Similarly, in some embodiments, the bottom major surface 1120' includes a plurality of recesses 1145' such that upon full mating of the ferrule 1100 with the mating ferrule 1100', each recess 1145' is disposed to receive a corresponding leading pad 90 of the optical ferrule 1100.

In some embodiments, the optical ferrule 1100 includes a plurality of pairs of first and second pads 90 and 100 such that when the optical ferrule 1100 mates with a mating optical ferrule 1100' including a plurality of pairs of first and second pads 90' and 100' the first pads (90, 90') of the ferrule 1100 and the mating ferrule 1100' contact a surface (1120', 1120) of the mating ferrule 1100' and the ferrule 1100, respectively, and upon full mating of the ferrule 1100 with the mating ferrule 1100', the second (100), but not the first (90), pads of the ferrule 1100 contact the surface 1120' of the mating ferrule 1100'. In some embodiments, the first pads (90, 90') of the ferrule 1100 and the mating ferrule 1100' are wiping pads for wiping the second pads (100', 100) of the mating ferrule 1100' and the ferrule 1100, respectively, and the second pads (100, 100') of the ferrule 1100 and the mating ferrule 1100' are mating pads for resting on the surface (1120', 1120) of the mating ferrule 1100' and the ferrule 1100, respectively. In some embodiments, when the ferrule 1100 is fully mated with the mating ferrule 1100', the mating pads 100 of the ferrule 1100 do not make contact with any pads on the surface 1120' of the mating ferrule 1100'. Similarly, in some embodiments, when the ferrule 1100 is fully mated with the mating ferrule 1100', the mating pads 100' of the mating ferrule 1100' do not make contact with any pads on the surface 1120 of the ferrule 1100.

Figure 12A:
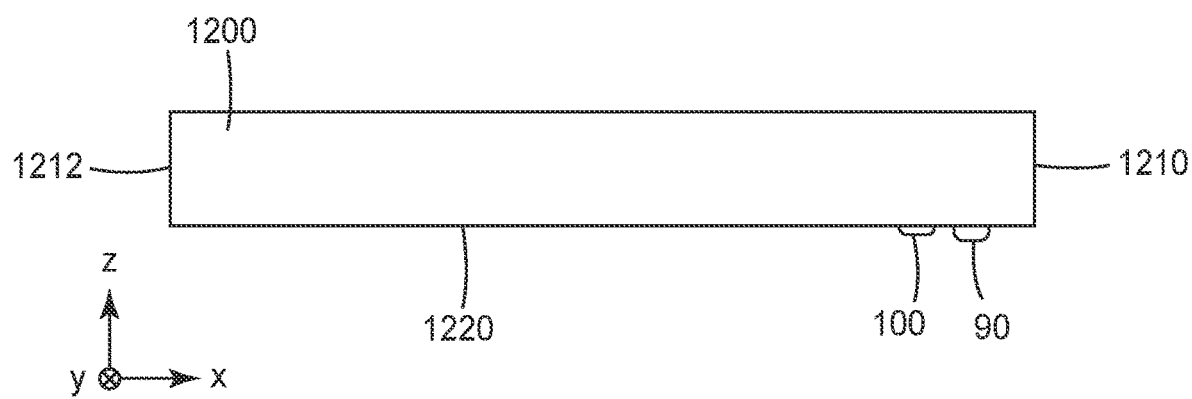
FIG. 12A is a schematic cross-sectional view of a portion of an optical ferrule.
Figure 12B:
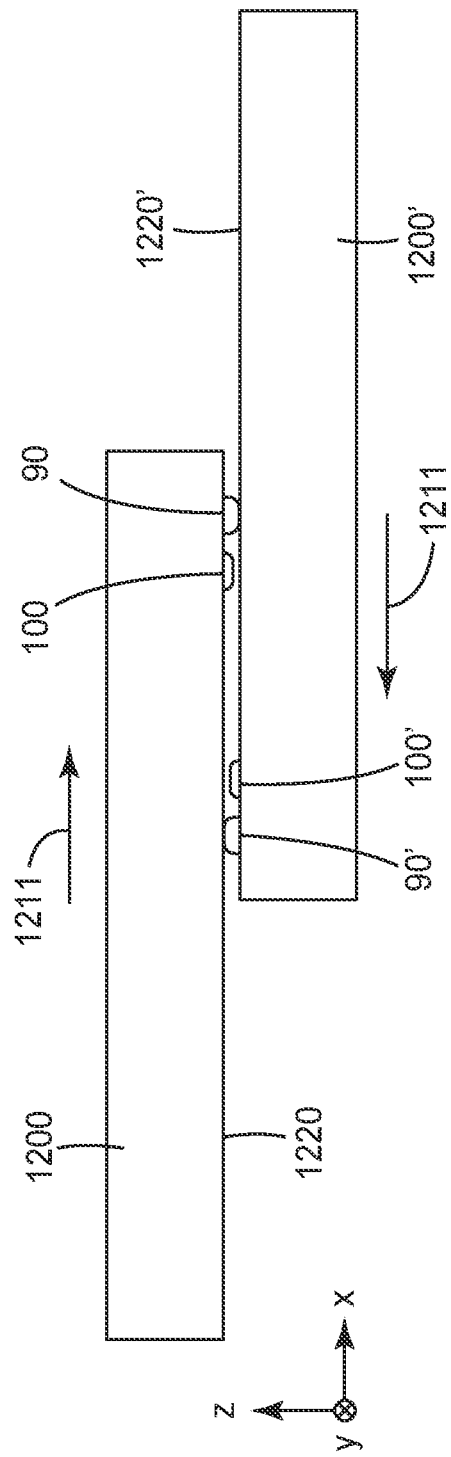
FIG. 12B is a schematic cross-sectional view illustrating the portion of the optical ferrule of FIG. 12A during mating with a corresponding portion of a mating optical ferrule.
Figure 12C:
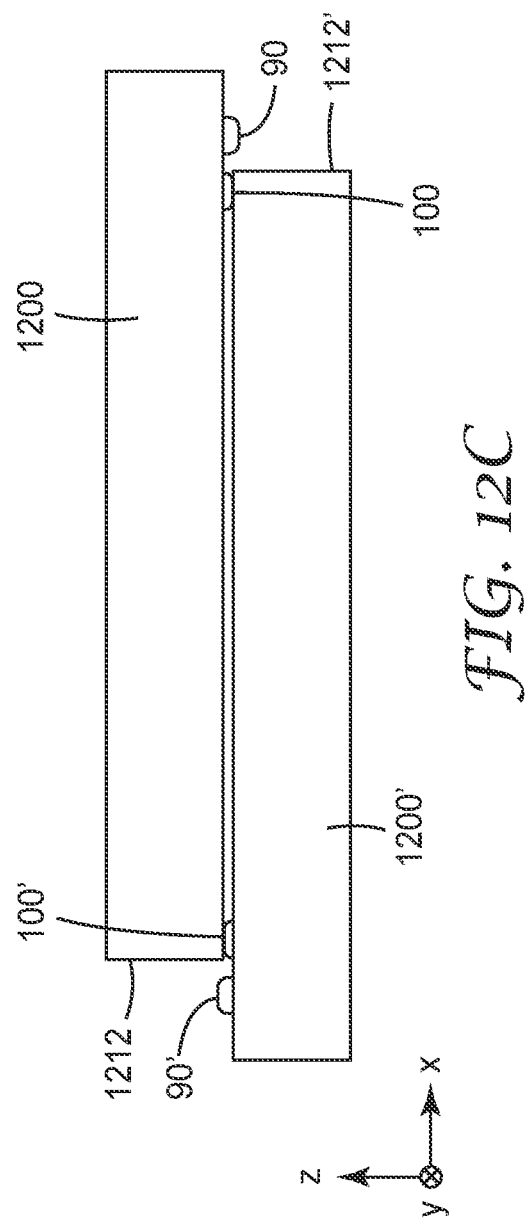
FIG. 12C is a schematic cross-sectional view illustrating the portions of the optical ferrule and mating ferrule of FIG. 12B fully mated with one another.

FIG. 12A is a schematic cross-sectional view of a portion of an optical ferrule 1200 having a bottom major surface 1220 including a plurality of pairs of leading and trailing pads 90 and 100. One pair of the pads are shown in the illustrated cross-section. At least one other pair may be present in a different cross-section. The optical ferrule 1200 has a leading end 1210 and trailing end 1212. FIG. 12B is a schematic cross-sectional view illustrating the portion of the optical ferrule 1200 during mating with a corresponding portion of a mating optical ferrule 1200'. The mating ferrule 1200' has a leading end 1210', a trailing end 1212', and a bottom surface 1220' including a plurality of pairs of leading and trailing pads 90' and 100'. During mating, the ferrule 1200 and mating ferrule 1200' move relative to one another along the mating directions 1211 and 1211'. FIG. 12C is a schematic cross-sectional view illustrating the optical ferrule 1200 fully mated with the mating optical ferrule 1200'. In FIG. 12C, the trailing pads 100 of the ferrule 1200 contact the bottom major surface of the mating ferrule 1200', but do not make contact with any pads on the major surface of the mating ferrule 1200'. Upon full mating of the ferrule 1200 with the mating ferrule 1200', each trailing pad 100 of the ferrule 1200 contacts the major surface 1220' of the mating ferrule 1200' proximate a trailing end 1212' of the matting ferrule 1200' and each leading pad 90 of the ferrule 1200 extends past the trailing end 1212' of the mating ferrule 1200' such that the leading pad 90 of the ferrule 1200 does not contact the mating ferrule 1200'. Similarly upon full mating of the ferrule 1200 with the mating ferrule 1200', each trailing pad 100' of the mating ferrule 1200' contacts the major surface 1220 of the ferrule 1200 proximate a trailing end 1212 of the ferrule 1200 and each leading pad 90' of the mating ferrule 1200' extends past the trailing end 1212 of the ferrule 1200 such that the leading pad 90' of the mating ferrule 1200' does not contact the ferrule 1200.

Figure 13A:
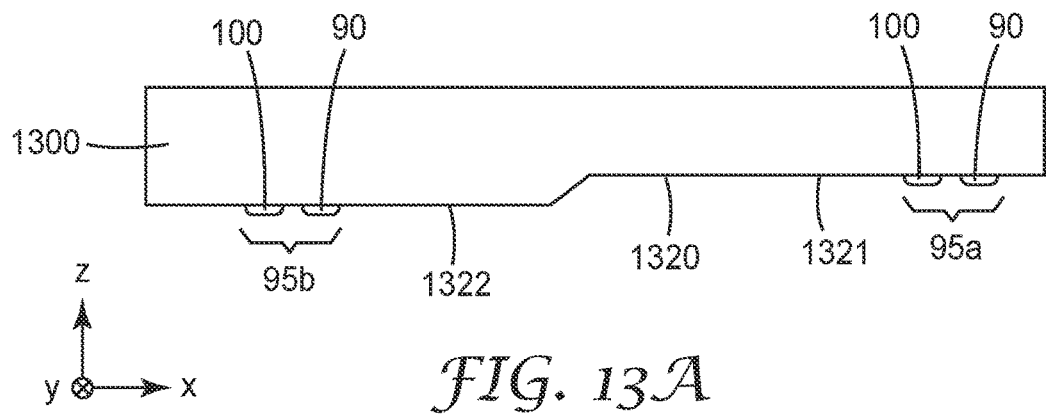
FIG. 13A is a schematic cross-sectional view of a portion of an optical ferrule.
Figure 13B:
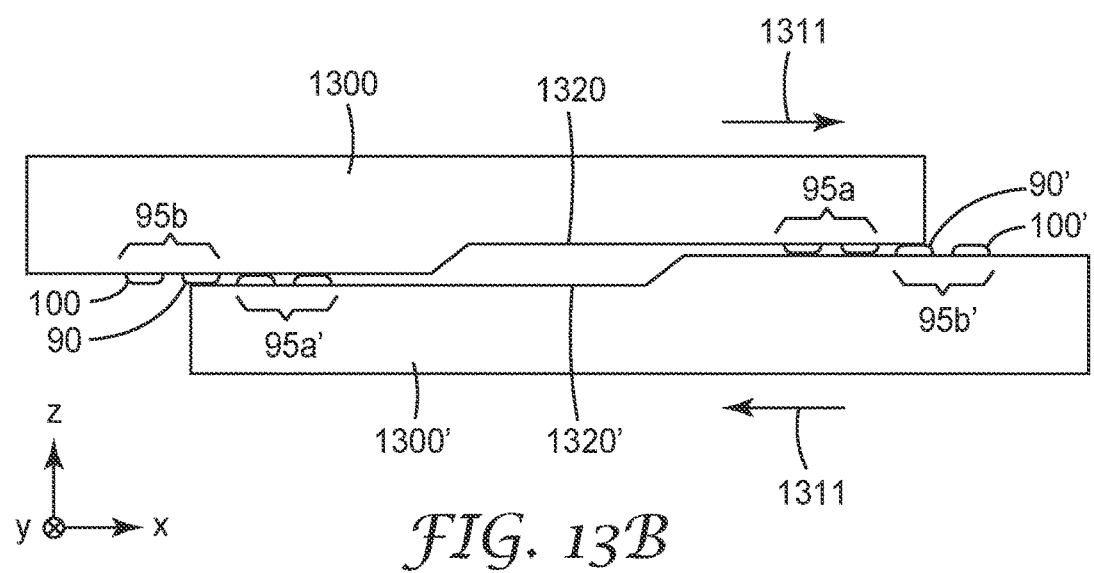
FIG. 13B is a schematic cross-sectional view of the portion of the optical ferrule of FIG. 13A during mating with a corresponding portion of a mating optical ferrule.
Figure 13C:
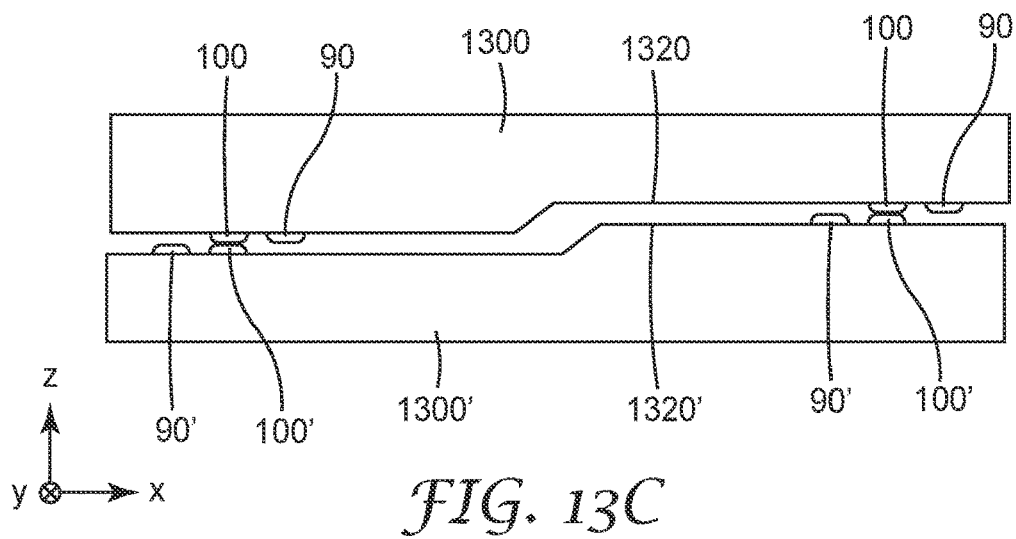
FIG. 13C is a schematic cross-sectional view of the portions of the optical ferrule and mating ferrule of FIG. 13B fully mated with one another.

FIG. 13A is a schematic cross-sectional view of a portion of an optical ferrule 1300 having a major surface 1320 including a plurality of pairs 95a and 95b of leading and trailing pads 90 and 100. In some embodiments, more pairs (e.g., three pairs, four pairs, or more pairs) of leading and trailing pads 90 and 100 are included. The plurality of pairs of leading and trailing pads include a first pair 95a of leading and trailing pads 90 and 100 disposed on a first portion 1321 of the major surface 1320 of the optical ferrule 1300 and a second pair 95b of leading and trailing pads 90 and 100 disposed on a different second portion 1322 of the major surface 1320 of the optical ferrule 1300. The first and second portions 1321 and 1322 are noncoplanar. In some embodiments, the first and second portions 1321 and 1322 are substantially planar (e.g., any radius of curvature of the first or second portion may be substantially larger (e.g., at least 5, or 10 or 20 times larger) than a largest lateral dimension of the portion) and substantially parallel (e.g., within 30, 20 or 10 degrees of parallel) to one another. FIG. 13B is a schematic cross-sectional view of the portion of the optical ferrule 1300 during mating with a corresponding portion of a mating optical ferrule 1300' and FIG. 13C is a schematic cross-sectional view illustrating the optical ferrule 1300 fully mated with the mating optical ferrule 1300'. During mating, the ferrule 1300 and mating ferrule 1300' move relative to one another along the mating directions 1311 and 1311'. The mating ferrule 1300' has a major surface 1320' including a plurality of pairs 95a' and 95b' of leading and trailing pads 90' and 100' corresponding to the pairs 95a and 95b of leading and trailing pads 90 and 100.

Figure 14:
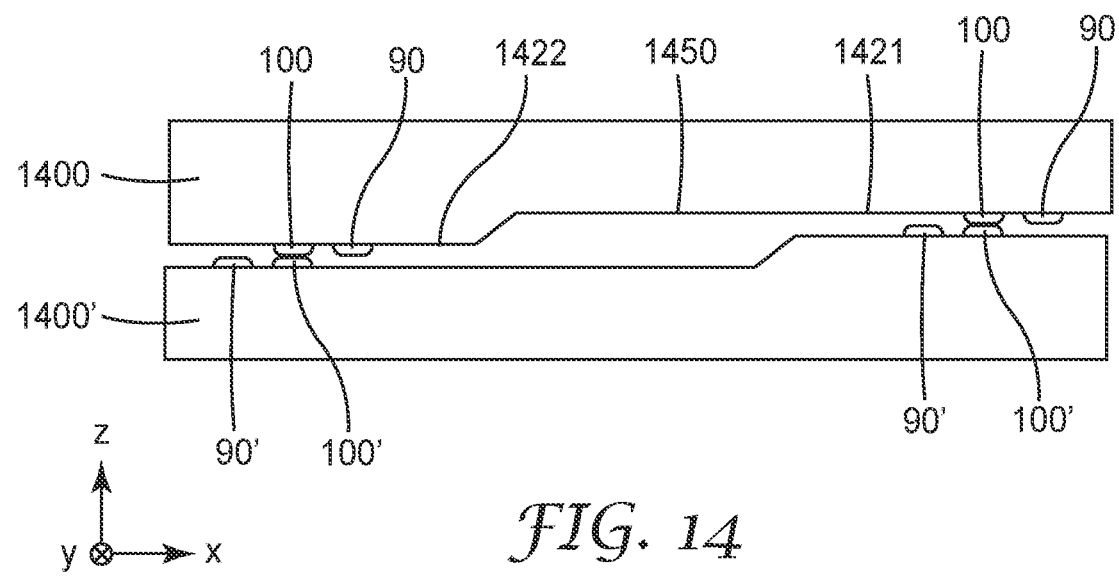
FIG. 14 is a schematic cross-sectional view of portions of an optical ferrule and a mating optical ferrule fully mated with one another.

FIG. 14 is a schematic cross-sectional view of a portion of an optical ferrule 1400 fully mated with a corresponding portion of a mating optical ferrule 1400'. Optical ferrule 1400 corresponds to optical ferrule 1300 except that a length along the mating direction of the first portion 1421 relative to the second portion 1422 has been increased compared to the first and second portions 1321 and 1322. This allows a window region 1450 to be provided through which light received by an optical waveguide and redirected by a light redirecting surface (not illustrated in FIG. 14) of the optical ferrule 1400 exits the optical ferrule 1400. In some embodiments, the optical ferrule 1400 and the mating optical ferrule 1400' are hermaphroditic.

In some embodiments of the present description, an optical device is provided that includes at least one pair of pads, protrusions, or platforms. The optical device may be or include an optical ferrule, an optical connector comprising a plurality of optical ferrules such as those described in U.S. Pat. Publ. Nos. 2018/0217337 (Smith et al.) or 2018/0284357 (Nelson et al.), an optical assembly including a ferrule mated with a mating ferrule or with a mating cradle, an optical assembly including an optical connector mated with a mating connector, or a cradle adapted to receive an optical ferrule, for example.

In some embodiments, a first optical device adapted to couple to a second optical device along a mating direction or coupling direction is provided. For example, the first optical device may be any optical ferrule described elsewhere herein and the second optical device may be any corresponding mating optical ferrule. As another example, one of the first and second optical devices may be a cradle adapted to receive an optical ferrule and the other of the first and second optical devices may be the optical ferrule.

Figure 15A:
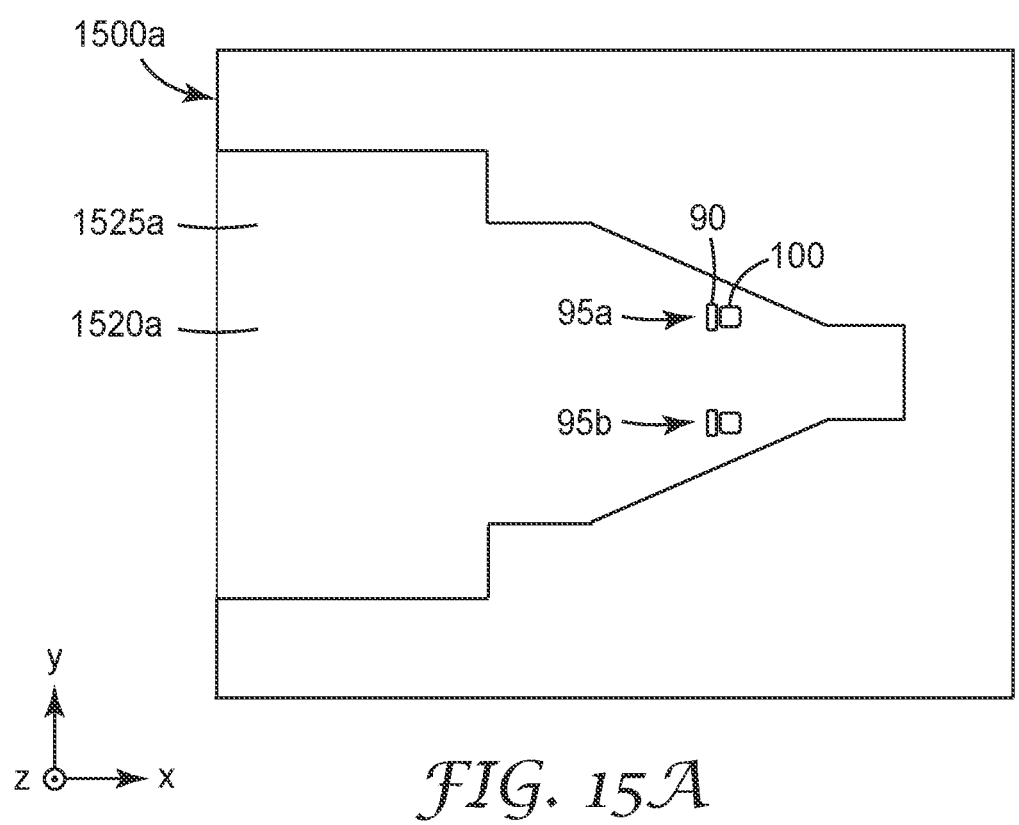
FIGS. 15A-15C are schematic top views of cradles.
Figure 15B:
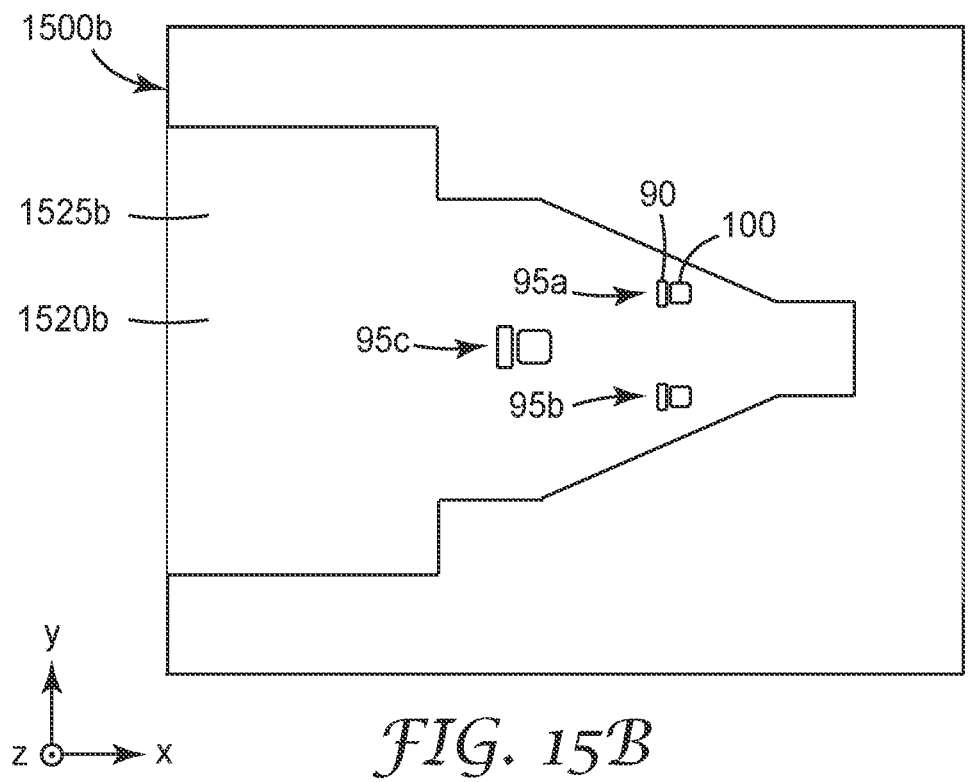
Figure 15C:
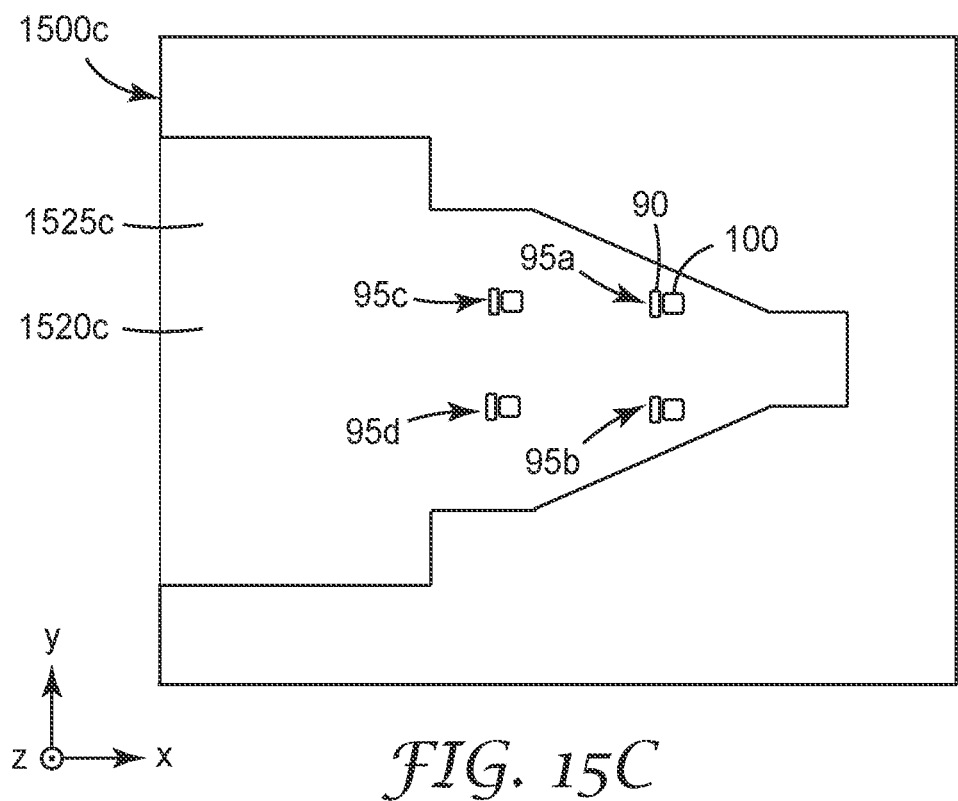

FIGS. 15A-15C are schematic top views of cradles 1500a-1500c having a respective cavity or recess 1525a-1525c adapted to receive an optical ferrule. The recesses 1525a-1525c have bottom surfaces 1520a-1520c, respectively, including a plurality of leading and trailing platforms, protrusions, or pads 90 and 100. The recesses 1525a-1525c are adapted to receive an optical ferrule along a coupling direction (x-direction) such that the optical ferrule approaches the leading pads 90 before the trailing pads 100. The bottom surfaces 1520a-1520c are landing surfaces for an optical ferrule. Conversely, the bottom surface of the optical ferrule can be considered to be a landing surface for the cradle. The bottom surface 1520a has two pairs 95a and 95b of leading and trailing pads 90 and 100. In some embodiments, the first and second pairs 95a and 95b are aligned on the bottom surface 1625 along a direction (y-direction) substantially orthogonal to the coupling direction (x-direction). The leading and trailing pads of the first and second pairs 95a and 95b may have a same or different size or shape. The bottom surface 1520b schematically illustrated in FIG. 15B includes three spaced apart pairs 95a-95c of leading and trailing pads 90 and 100. In some embodiments, the first and second pairs 95a and 95b are aligned on the bottom surface 1625 along a direction (y-direction) substantially orthogonal to the coupling direction (x-direction) and a third pair 95c is noncolinear with the first and second pairs 95a and 95b. In some embodiments, the leading and trailing pads of the first and second pairs 95a and 95b have a same size and shape, and the leading and trailing pads of the third pair 95c may have a same or different size or shape than those of the first and second pairs 95a and 95b. For example, the leading and trailing pads of the third pair 95c may be larger than the leading and trailing pads of the first and second pairs 95a and 95b. The bottom surface 1520c schematically illustrated in FIG. 15C includes four paced apart pairs 95a-95d of leading and trailing pads 90 and 100. In some embodiments, the leading and trailing pads are arranged in respective first and second regular arrays.

Other arrangements of the pairs of leading and trialing pads are possible. For example, additional pairs may be included, or the pairs may be arranged in alternate patterns, or the leading and/or trailing pads may have different sizes and/or shapes. The pairs of the leading and trailing pads 90 and 100 schematically illustrated in FIGS. 15A-15C can optionally be disposed in a recess defined in the bottom surface as described further elsewhere herein.

Figure 16:
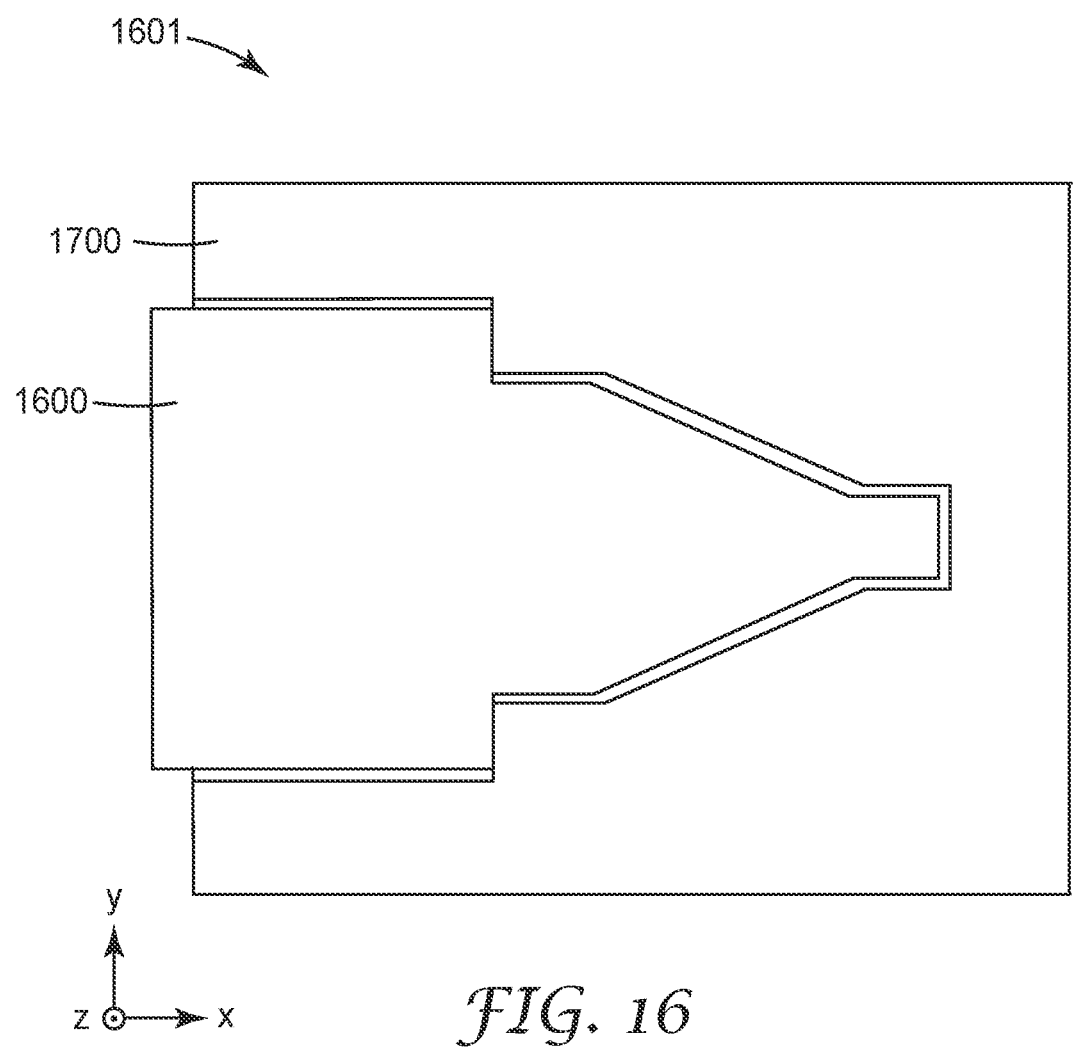
FIG. 16 is a schematic top view of an optical assembly including an optical ferrule mated with a cradle.

FIG. 16 is a schematic top view of an optical assembly 1601 including an optical ferrule 1600 mated with a cradle 1700. The optical ferrule 1600 may correspond to any of the optical ferrules described elsewhere herein. For example, the optical ferrule 1600 may include a plurality of grooves and light redirecting surfaces (not illustrated in FIG. 16) such as those illustrated in FIG. 1A, 2, 5A, or 5B, for example. The cradle 1700 may correspond to any of cradles 1500a-1500c, for example. In some embodiments, the cradle 1700 includes a recess or cavity for receiving the optical ferrule 1600, and the second (100), but not the first (90), platform(s) of the optical ferrule 1600 contacts a bottom major surface of the cavity. In some embodiment, the bottom major surface of the cradle 1700 includes first and second platforms corresponding to the respective first and second platforms of the optical ferrule 1600, and the second platform(s) of the optical ferrule 1600 contacts and rests on the second platform(s) of the cradle 1700.

An optical ferrule of the present description may be unitary. A unitary body is a single piece construction that does not have any internal interfaces, joints, or seams. A unitary body can be made by molding (e.g., injection molding a thermoplastic), casting or machining, for example. Other optical devices (e.g., a cradle adapted to receive an optical ferrule) of the present description may be unitary and/or may be made by molding.

Terms such as "about" will be understood in the context in which they are used and described in the present description by one of ordinary skill in the art. If the use of "about" as applied to quantities expressing feature sizes, amounts, and physical properties is not otherwise clear to one of ordinary skill in the art in the context in which it is used and described in the present description, "about" will be understood to mean within 10 percent of the specified value. A quantity given as about a specified value can be precisely the specified value. For example, if it is not otherwise clear to one of ordinary skill in the art in the context in which it is used and described in the present description, a quantity having a value of about 1, means that the quantity has a value between 0.9 and 1.1, and that the value could be 1.

All references, patents, and patent applications referenced in the foregoing are hereby incorporated herein by reference in their entirety in a consistent manner. In the event of inconsistencies or contradictions between portions of the incorporated references and this application, the information in the preceding description shall control.

Descriptions for elements in figures should be understood to apply equally to corresponding elements in other figures, unless indicated otherwise. Although specific embodiments have been illustrated and described herein, it will be appreciated by those of ordinary skill in the art that a variety of alternate and/or equivalent implementations can be substituted for the specific embodiments shown and described without departing from the scope of the present disclosure. This application is intended to cover any adaptations or variations of the specific embodiments discussed herein. Therefore, it is intended that this disclosure be limited only by the claims and the equivalents thereof

What is claimed is:

1. A first optical device adapted to couple to a second optical device along a coupling direction and comprising two spaced apart pairs of leading and trailing pads, such that when the first optical device lands and slides on a landing surface of the second optical device to optically couple to the second optical device, and for each pair of leading and trailing pads, the leading pad prevents any debris on the landing surface from collecting on the trailing pad, wherein upon full coupling of the first optical device with the second optical device, the leading pads do not make contact with the landing surface.

2. The first optical device of claim 1 being an optical ferrule.

3. The first optical device of claim 2 comprising opposing major top and bottom surfaces, the major top surface comprising a groove and a light redirecting surface, the light redirecting surface configured to receive light along a first direction from an optical waveguide received and supported in the groove and redirect the received light along a different second direction, the redirected light exiting the optical ferrule through the bottom surface, the bottom surface comprising the two spaced apart pairs of leading and trailing pads.

4. The first optical device of claim 3, wherein the two pairs of leading and trailing pads are aligned along a third direction substantially orthogonal to the first and second directions.

5. The first optical device of claim 4, wherein the bottom surface comprises three spaced apart pairs of leading and trailing pads.

6. The first optical device of claim 4, wherein the bottom surface comprises four spaced apart pairs of leading and trailing pads.

7. The first optical device of claim 6, wherein the leading and trailing pads are arranged in respective first and second regular arrays.

8. The first optical device of claim 1 being a cradle comprising a recess adapted to receive an optical ferrule, the recess having a bottom surface comprising the two spaced apart pairs of leading and trailing pads.

9. The first optical device of claim 8, wherein the bottom surface comprises at least three spaced apart pairs of leading and trailing pads.

10. An optical ferrule comprising a plurality of pairs of wiping and mating pads such that when the optical ferrule mates with a mating optical ferrule comprising a plurality of pairs of wiping and mating pads, the wiping pads of the ferrule and the mating ferrule wipe the mating pads of the mating ferrule and the ferrule, respectively, and upon full mating of the ferrule with the mating ferrule, the mating pads of the ferrule and the mating ferrule contact one another.

11. The optical ferrule of claim 10, wherein when the ferrule is fully mated with the mating ferrule, the wiping pads of the ferrule do not contact the mating ferrule.

12. An optical ferrule comprising a first protrusion disposed between a second protrusion and a leading end of the ferrule, the ferrule configured to mate with a mating optical ferrule comprising a first protrusion disposed between a second protrusion and a leading end of the mating ferrule, such that when the ferrule fully mates with the mating ferrule, the second protrusions of the ferrule and the mating ferrule make contact with and rest on each other, the first protrusions of the ferrule and the mating ferrule are disposed on opposite sides of the second protrusions, and the first protrusion of each ferrule faces a major surface of the other ferrule without contacting it.

13. The optical ferrule of claim 12 comprising opposing major top and bottom surfaces, the major top surface comprising a groove and a light redirecting surface, the light redirecting surface configured to receive light along a first direction from an optical waveguide received and supported in the groove and redirect the received light along a different second direction, the redirected light exiting the optical ferrule through the bottom surface, the bottom surface comprising the first and second protrusions.

14. The optical ferrule of claim 12, wherein during a mating of the optical ferrule with a mating ferrule, the first protrusions of the optical ferrule slides against and moves past a corresponding first protrusion of the mating ferrule and then the first protrusion of the optical ferrule slides against and moves past a second protrusion of the mating ferrule corresponding to the second protrusion of the optical ferrule.

15. The optical ferrule of claim 14, wherein upon full mating of the ferrule with the mating ferrule, the second protrusions of the ferrule and the mating ferrule remain in contact with and rest on each other, and the first protrusion of neither ferrule makes contact with the other ferrule.

16. The optical ferrule of claim 12, wherein the first and second protrusions are disposed on a bottom surface of the optical ferrule and extend higher than a region of the bottom surface proximate the first and second protrusions by respective first and second distances d1 and d2.

17. The optical ferrule of claim 16, wherein d1 is substantially equal to d2.

18. The optical ferrule of claim 16, wherein d1>d2.

19. The optical ferrule of claim 16, wherein the bottom surface defines a recess therein, the first and second protrusions being formed in the recess, the region of the bottom surface proximate the first and second protrusions being adjacent to and outside of the recess.

20. The optical ferrule of claim 16, wherein d1 and d2 are each at least about 5 microns.

* * * * *